United States Patent
Nusholtz et al.

(10) Patent No.: US 6,301,535 B1
(45) Date of Patent: Oct. 9, 2001

(54) OPTIMIZATION OF A SINGLE-POINT FRONTAL AIRBAG FIRE THRESHOLD

(75) Inventors: Guy S. Nusholtz, Bloomfield; Yibing Shi, Novi; Lan Xu, Rochester Hill, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/426,845

(22) Filed: Oct. 26, 1999

(51) Int. Cl.$^7$ ................................. G06F 17/00; G06F 7/00
(52) U.S. Cl. ................................. 701/45; 701/46; 180/271; 180/282; 280/735
(58) Field of Search .................................. 701/45, 46, 47; 180/268, 271, 282; 280/735

(56) References Cited

U.S. PATENT DOCUMENTS

| | | | |
|---|---|---|---|
| 4,958,851 | * 9/1990 | Behr et al. | 280/735 |
| 5,345,402 | * 9/1994 | Gioutsos et al. | 701/47 |
| 5,684,701 | * 11/1997 | Breed | 701/45 |
| 6,070,113 | * 5/2000 | White et al. | 701/45 |
| 6,129,380 | * 10/2000 | Rink et al. | 280/737 |

OTHER PUBLICATIONS

Nusholtz et al., "Estimation of Occupant Position from Probability Manifolds of Air Bag Fire–times", Society of Automotive Engineers, Inc., Mar. 1998, Paper No. SA980643, pp. 1–10.

Nusholtz et al., "Estimation of OOP from Conditional Probabilities of Airbag Fire–times and Vehicle Response", 16$^{th}$ International Technical Conference on the Enhanced Safety of Vehicles, May 1998, Paper No. 98–S5–O–16, pp. 1–11.

* cited by examiner

*Primary Examiner*—William A. Cuchlinski, Jr.
*Assistant Examiner*—Gertrude Arthur
(74) *Attorney, Agent, or Firm*—Mark P. Calcaterra

(57) ABSTRACT

A method of optimization of a single-point frontal airbag fire threshold. The relationship of the airbag fire distribution as a function of velocity to the airbag fire-time is characterized through the use of an optimization procedure. The optimization is conducted by abstracting the sensor algorithm and its associated constraints into a simple mathematical formulation. An airbag fire objective function is constructed that integrates the fire-rate and fire-time requirements. The function requires the input of a single acceleration time history, and it produces an output depending on the airbag fire condition. Numerical search of the optimal fire threshold curve is achieved through parameterizing this curve and applying a modified simplex search optimization algorithm that determines the optimal threshold function parameters without computing the complete objective function in the parameter space.

40 Claims, 19 Drawing Sheets

OPTIMIZATION OF A SINGLE-POINT FRONTAL AIRBAG FIRE THRESHOLD

BACKGROUND OF THE INVENTION

1. Field of the Invention

This invention relates generally to airbag firing systems and, more particularly, to an optimization of a single-point frontal airbag fire threshold for determining when to fire an airbag.

2. Discussion of Related Art

Airbags are a common safety device in today's motor vehicles. Airbags work, in conjunction with seatbelts, to provide additional restraints for passengers during collisions. Upon impact in a crash, one or more airbags will deploy to provide a cushion for the occupants of the vehicle. The deployed airbag will prevent an occupant from being thrown forward during a crash and from impacting the front console, steering wheel or windshield. Side airbags are also becoming more common. These airbags deploy from the interior sides of an automobile and protect the occupants against lateral injuries.

Once an airbag is deployed, it is a costly and time-consuming process to service the airbag for reuse. This process may involve replacing one or more parts of the airbag system at considerable time and expense to the vehicle's owner. Therefore, it is not desirable to deploy an airbag during every collision. For instance, during a low speed crash the impact of the vehicle may not be sufficient to injure its occupants, and deploying the airbag would not serve a substantial protective function. Drivers often back into inanimate objects or frequently bump into other cars at stoplights or in parking lots. For these types of collisions, airbag deployment is not desirable. Rugged driving conditions or rapid braking may frequently appear to the airbag sensors to be a collision, but in these conditions deploying the airbag is not desirable.

Additionally, it is known that the airbag deployment itself may cause injuries. The rapid force of the airbag deployment causes the physical injuries. During high velocity collisions, the benefit of the protection afforded by the airbag far outweighs any injury its deployment may cause; however, at low speeds the airbag deployment itself may cause physical injuries while serving a substantially diminished protective function. Due to this tradeoff, it is desirable to deploy airbags only for high speed crashes, front impact crashes and other accidents that have a high rate of injury.

Since airbags are not utilized in all types of crashes, it is necessary to determine when a crash occurs and to differentiate between the severity of different collisions. Vehicles typically have one sensor mounted in the passenger compartment of the vehicle, although it is possible to use more than one sensor. The sensor may be of any known type, such as a switch, an accelerometer, or a velocity, force or position sensor. The sensor sends its information to the airbag control system, which uses the readings to determine when to properly fire the airbag. The airbag control system must differentiate between sensor readings that are caused by hard braking from high velocities (a non-fire condition) and a head-on crash at a low velocity (a fire condition), for instance, and fire the airbag appropriately.

Crash severities are measured against a barrier equivalent speed. For instance, a hundred mile an hour change in velocity may occur over a long period of time. This change may be due to hard braking, and airbag deployment would not be necessary. This would equate to a small barrier equivalent velocity one that would be less than the firing criterion. A fifteen mile an hour crash may occur into a rigid structure. For this crash airbag deployment may be necessary, even though the total change in speed is less than for the one hundred mile an hour braking change. The barrier equivalent velocity for the fifteen mile an hour crash would be higher than the firing condition, and the airbag would fire.

Several problems make an absolute determination of airbag firing difficult. Different collision velocities and different collision angles will produce varying sensor readings. From these changing readings, the collision velocity and type must be accurately determined. It is not physically possible to test all crash conditions when building the airbag deployment system, nor is it economically feasible. Therefore, since the sensor response for all collision conditions is not known, it is extremely difficult to determine a firing algorithm that will only fire during a collision and will not fire during any other time.

The performance and reliability of an airbag during crash conditions can be quantified based on three quantities: fire-time, threshold and fire-rate. The fire-time is the point in time when the airbag module is triggered. Threshold, also called "threshold velocity", is a velocity above which the airbag should fire, and below which the airbag should not fire. Fire-rate is the percentage of times, probability, that the airbag will fire for a given velocity. Ideally, an airbag should always deploy for a collision above the threshold velocity and it should never deploy for a collision below the threshold velocity.

The optimization of both the sensor readings and the three performance quantities is a difficult endeavor. For any given crash that involves an airbag-equipped vehicle, the severity of the impact must be assessed. This information is then used to determine if the airbag should be deployed. The accuracy of determining whether to deploy the airbag can be greatly improved if it is made after the crashed has ended, because the greatest amount of crash information will have been obtained. However, the effectiveness of the airbag will have reached a minimum; the earlier an airbag is fired during a crash, the greater its effectiveness. If the airbag is deployed when the vehicle crash is initiated, then its effectiveness will be maximized. However, if an airbag is instantly deployed, little or no information on the crash severity will be obtained and either the airbag will deploy in all crashes regardless of velocity, or the fire-rate curve will be very broad. As a result of these considerations, there is an inherent tradeoff between fire-rate and time-to-fire in an airbag deployment system.

Present methods for determining the firing threshold in an airbag deployment system use substantially subjective methods. First, a number of crash tests are run on a vehicle. These crash tests are varied over a number of speeds and a number of levels of severity. In some of the crashes it will be desirable to fire the airbag; however, in some tests it would not be desirable to fire the airbag. The sensor readings from all these tests are recorded. Next, the requirements for firing the airbag are determined. These requirements include primarily setting two quantities: fire-velocity and fire-time. In a crash above the fire-velocity, the airbag should always fire, and in a crash below the fire-velocity the airbag should never fire. Also, if the airbag is going to fire, then it should fire before the fire-time. After the requirements are determined, the sample data is manually fit to make a firing threshold curve. Various parameters in the curve may be adjusted to fit the data, so that in each sample crash the appropriate firing determination is made.

Airbag fire conditions are complex, and there exists a tradeoff between firing early, for maximum airbag effectiveness, and firing late, for maximum accuracy. In light of these conflicting requirements, it is often not possible to fit the data taken from the crash tests into a continuous firing threshold curve. Currently, when the data and the requirements conflict, the problem is solved by altering the requirements so that a new and achievable threshold curve can be established. This process is done subjectively by the designers of the system. There is currently no way to quantify the tradeoffs made between early fire time and accuracy in altering the requirements to fit a threshold curve. Therefore, optimization of the tradeoffs is not possible in the current process for establishing the threshold firing curve. The current methods only marginally accomplish the required task of determining the threshold curve and making the compromise between the tradeoffs, because the current methods are most often subjective.

Airbag systems are becoming increasingly complex. New systems integrate more than one sensor into the vehicle. Additionally, multi-stage airbag systems are being constructed. These systems fire one stage of the airbag at a determined time and may also fire a second stage at a later time. The firing criteria for the different stages may be based on different velocity or acceleration characteristics. The current methods of manually fitting a firing threshold to the known data points will not be adequate to determine a firing threshold for these new and more complex systems.

In light of these considerations, there exists a need for an improved method of determining airbag fire conditions. This method must take into account the varying sensor readings for different types and speeds of crashes. The method must balance the tradeoff between achieving a rapid fire-time and the length of time needed to acquire accurate data about a crash's severity, and it must be adaptable to emerging airbag technologies.

SUMMARY OF THE INVENTION

In accordance with the teachings of the present invention, a method of optimizing a single-point fire threshold for an automobile airbag is disclosed.

Vehicle testing is an important part of determining the efficiency of any method of airbag deployment; however, as the number of tests increases, the testing quickly becomes cost prohibitive. In the present invention, multiple sensor signals at several desired impact velocities are generated. Known methods, such as Monte Carlo-like simulation, are used to produce additional, simulated crash data signals to supplement the limited physical tests. Interpolation, based on tests from neighboring velocities, can be used to acquire sensor readings at velocities where no physical tests were taken.

Next, an objective function is used to analyze the data. The objective function integrates the fire-rate and fire-time requirements. The function requires the input of a single acceleration time history, and it produces an output depending on the airbag fire condition. The objective function makes use of two specific functions: a time penalty function and a velocity penalty function. These two functions balance the competing poles of firing early for maximum effectiveness and firing late for maximum accuracy. The objective function allows the evaluation of the tradeoff between firing early and reading the maximum amount of data regarding the crash in an overall firing scheme analysis.

Several parameters are defined in the penalty functions. Two variables are used to bias the velocity and time penalty functions so that fires occurring at a velocity lower than the fire-velocity and later than the maximum fire-time are penalized more. Two additional parameters, $\alpha$ and $\beta$, are used to regulate the relative magnitude of the time penalty weights of the four different fire conditions.

The airbag fire decision is made based on a threshold curve in the fire criterion space. The decision space can be based on different logic relating to the fire control. For example, if the criterion is simply the level of the deceleration, then the "space" is one-dimensional, i.e., the acceleration magnitude axis with the threshold (curve) being a point on that axis. The present invention, in one embodiment, utilizes a deceleration (a) velocity change ($\Delta v$) (integration of the deceleration over time) space as the fire decision. Therefore, the threshold takes the form of a curve $a^{th} = f(\Delta v)$ in the a-$\Delta v$ space. The threshold curve is optimally parameterized using three variables.

For a given set of threshold curve parameters, each of the set of calibration signals will produce a fire condition: fire or not fire, and if fire, the fire-time. These, along with the impact velocity of the signal, produce an objective function contribution of this particular signal. The sum of the contributions from all the signals gives the total objective function. By varying the parameters of the threshold curve, the response surface of the objective function is computed. With the objective function response surfaces from the individual impact velocities, the total objective function is their sum. The optimal combination of the threshold curve parameters may be determined by locating the lowest point of the response surface, and the corresponding fire condition may therefore be determined.

The optimal threshold curve parameters are obtained through finding the minimum after the objective function is fully mapped out in the feasible sub-region of the parameter space. A modified search algorithm is used to span the parameter space and find the optimal combination of parameters.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to the optimization of a single-point frontal airbag fire threshold is merely exemplary in nature and is in no way intended to limit the invention or its applications or uses.

Figures 1A, 1B:
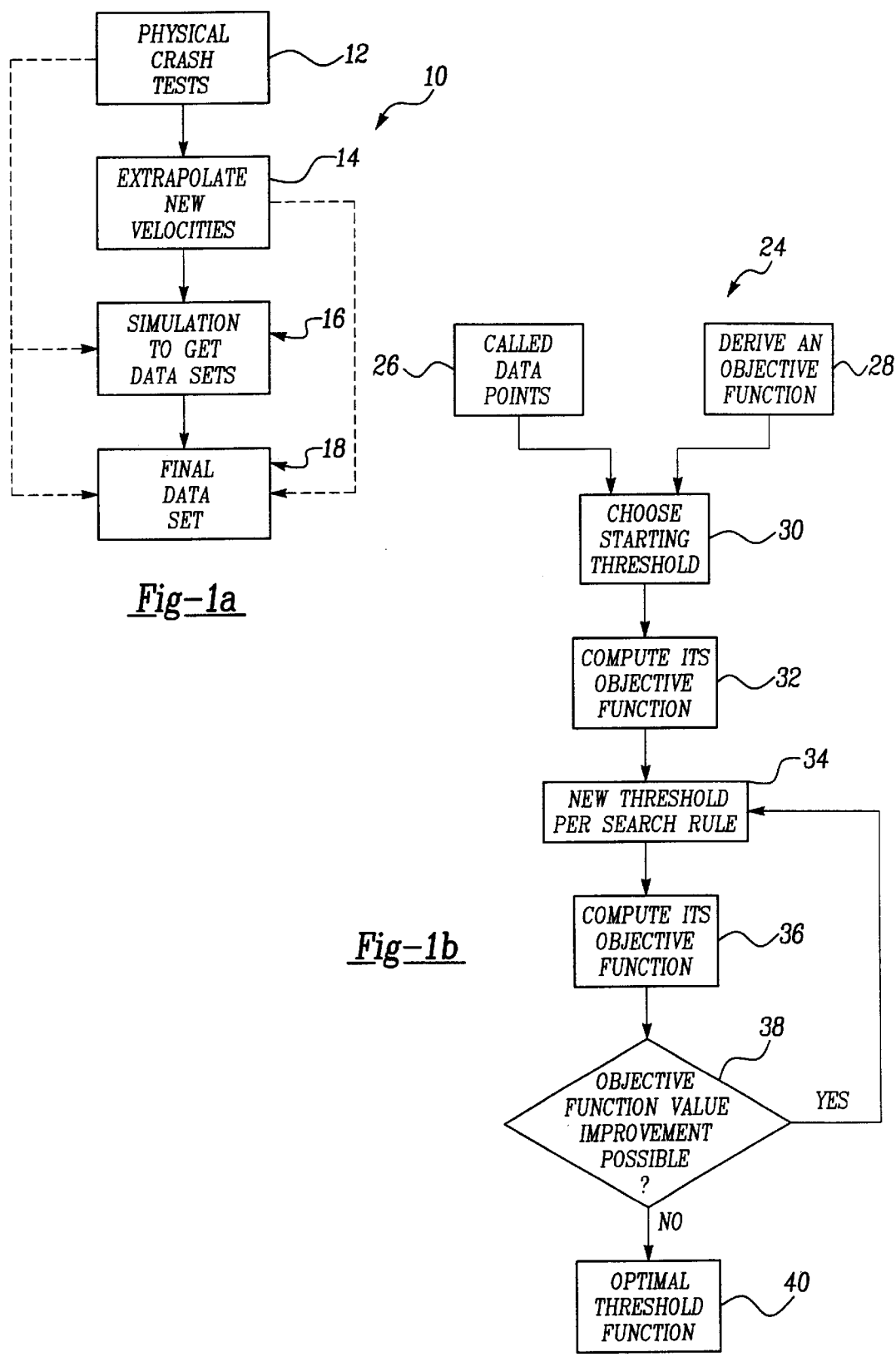
FIGS. 1(a–b) are flow charts detailing the collection of data to be used in the design process and the overall design methodology.

FIG. 1(a) is a general flowchart 10 showing the steps for acquiring airbag firing data, according to an embodiment of the present invention. First, physical crash tests are performed at box 12, and the sensor readings during the crashes are recorded. The crash velocities are known and are also recorded along with the sensor readings. Determining the number of crashes and the velocities to be used in the crash tests will be subsequently discussed. Next, extrapolation is performed to acquire data for velocities at which there were no physical tests, at box 14. For example, data from a 14 mph crash and a 16 mph crash can be extrapolated to produce data from a 15 mph crash.

After the data has been extrapolated and all the desired velocities have been produced, simulation may be performed to produce additional data sets beyond the physical crash tests and the extrapolated data sets, at box 16. In the preferred embodiment, Monte Carlo-like simulation is used to produce additional data sets, but other methods may also be used. The final result of the process are the data sets that will be used in developing the optimal firing threshold curve, at box 18.

It should be noted that several variations in the acquisition of data are possible, and that only some of these are detailed in the flow chart 10. In another embodiment, extrapolating new velocities, at the box 14,, may be bypassed. Only the data from actual physical crash tests is used in developing the threshold curve. After the physical tests are performed at the box 12, then simulations are performed only on the physical data at the box 16.

In another embodiment, the final data set may be solely the physical crash test data, where the boxes 14 and 16 would be bypassed. The final data sets at the box 18, are the results of performing the physical crash tests at the box 12.

In another embodiment, the simulations to produce new data sets, at the box 16, may be bypassed. Physical crash tests are taken, at the box 12, and data for new velocities is extrapolated, at box the 14. The data from these two steps represents the final data set at the box 18.

It should also be noted, that the versatility of this process is derived from its ability to be used with various starting data sets. Acquiring data may simply consist of using a data set already provided; it is not always necessary to start by running physical crash tests. The data set used may also be generated solely by computer, a combination of the methods previously discussed or other in some other manner.

FIG. 1(b) shows a flow chart 24 for the overall design process. Data points are collected at the box 26, and an objective function is derived at the box 28. The objective function is an equation that rates the performance of an airbag's firing based on a sensor time-history and predefined firing requirements. The objective function quantifies deviations from ideal firing characteristics. The collection of data points at the box 26 has been previously discussed, and the method for developing an objective function at the box 28 will be subsequently developed.

Once the steps at the boxes 26 and 28 have been completed, a starting threshold curve is found at box 30. The determination of the threshold curve will be subsequently discussed. The objective function of the threshold curve is computed at box 32. This initial threshold curve may not be the optimal curve in the decision space, but it serves as the starting point for evaluation. As additional threshold curves are found that are more optimal, as evaluated by the objective function, the optimal threshold curve is replaced.

Next, a new threshold curve is found at box 34 based on the threshold search rule. The objective function of the new threshold curve is computed at box 36. The objective function of the new threshold curve is measured against the objective function of the optimal threshold curve at decision diamond 38 where it is determined if an object function improvement can be obtained. If an objective function improvement cannot be obtained, then the new threshold curve is saved as the new optimal threshold curve at box 40. If an objective function improvement can be obtained, then the process returns to the box 34 to determine a new threshold.

If all the possible threshold curves have been checked, then the space has been spanned and all possible threshold curves have been evaluated; therefore, the optimal curve has been found at the box 40. It should be noted that finding the optimal threshold curve may proceed in an automated manner, or it may proceed by manual evaluation or by some other manner. The decision space for finding the threshold curve may be limited to a finite number of values based upon predetermined conditions. Once the threshold curve has been determined, it is used in an airbag control system. Airbag sensor readings are taken over a time history, and they are plotted against the decision space for the airbag firing. If the sensor readings reach the threshold, then the airbag fires. Otherwise, the airbag does not fire. The implementation of threshold curves, once they have been chosen, can be in any manner known in the art.

The high-level design process has been introduced and discussed, with reference to FIGS. 1(a) and 1(b). A more detailed discussion of the implementation follows.

As previously discussed, the input to the design process is a set of sensor histories. These histories may be generated exclusively by computer or by physical test, or they may be a combination of both. Variation exists among acceleration time-history of signals of nominally identical tests, especially in the high frequency components. The sources of the variations may be inaccuracy in instrumentation, the inherent chaotic nature of the details of the crash and variation in the build of the test vehicles. As a result, variation in the signals becomes an important factor in establishing a robust threshold function for sensor systems that are dependant on the deceleration signals. One way to account for the variations is to attempt to estimate the statistical characteristics of the variations, and then fold these into the threshold function determination process. The approach can be addressed by several different techniques. An appealing methodology is to numerically generate crash deceleration signals using a Monte Carlo type procedure with the variation based on signals from limited physical tests. In one embodiment of the current invention, signal variation is dealt with by generating 100 sensor signals at each desired impact velocity, in two mile per hour (mph) increments, based on 16 to 20 actual physical tests.

The basic principle for the generation of signals is decomposition and recombination. Each vehicle crash signal is decomposed into different frequency domains and then recombined. For example, if two base signals from actual physical crashes are decomposed into two frequency domains, high and low, the recombination can be used to create four signals. If it is decomposed into three frequency domains low, mid and high, then six signals can be created. Once the number of base signals have been obtained and the number of decomposition levels determined, recombination can be accomplished by a Monte Carlo method. In addition, constraints are placed upon the results to ensure that they are physically possible. If a created signal deviates by more than three standard deviations, at any point in time, from the average of the base signals, then it is rejected. The integral of any created signal cannot be more than one standard deviation from the outer bounds of the corridor formed by the original base signals. Finally, a shape function is used to ensure that the change in shape magnitude and phase are within the range of the original signals.

To generate signals for impact velocities where no actual test data are available, interpolation is used based on tests from neighboring velocities. Usually, crash signals have certain characteristics rooted to the structure deformation during impact. Those characteristics, such as peak value, time to peak and acceleration pulse shape are different at different impact speeds. Time history inspection as well as auto- and cross-correlation are used to identify these characteristics during different time intervals. Then, the new data sets for intermediate impact velocities are created in accordance with the characteristics and variances from the time history and the correlation analysis. This procedure is checked by comparing the created signals with crash test signals not used in the model building. Once a new set of mathematically synthesized baseline signals has been established, the techniques discussed above are applied to generate the required number of signals.

Once the input data sets have been acquired or produced, an objective function is introduced. The input represents crash histories, and the fire or not-fire determinations are known. The quality of a given threshold curve for the data sets can then be assessed with the following objective function:

$$p = \frac{1}{n}\sum_{i=1}^{n} pt_i(t(\text{threshold, signal})) \times pv_i(\text{signal}) \qquad 1$$

where, n is the number of signals to be used to establish the threshold curve, pt is a function of the fire-time t for the $i^{th}$ signal, and pv is a function of the velocity of the ith signal. By its form, the value of p is ultimately determined by the threshold curve and the set of input signals. Essentially, equation (1) can be interpreted as a set of signals that has a contribution to the total objective function, and the contribution is determined by its impact velocity and the fire-time which is in turn determined by the threshold curve. Since both the velocity and the fire-time are included in this objective function, it can be a comprehensive assessment of the fire event. We can choose a specific form for each of the function shown in equation (1) such that the lowest value of function p represents our most desired fire condition with the given set of signals. As such, the functions of pt and pv can be constructed so that the more "undesirable" a fire condition for a signal is, the higher its value will be. Hence, the functions pt and pv are termed time penalty function and velocity penalty function. In the following, particular forms for these functions are presented. The discussion below uses acceleration as the input function for the velocity penalty function and the time penalty function. However, as will be appreciated by those skilled in the art, other input functions, such as pressure or displacement, can also be used.

Fundamentally speaking, the exact form for the functions p, pt and pv should be chosen to analytically represent the evaluation of the fire condition. However, the later is philosophical in nature and does not lend itself to a simple, analytical function. The choice for the exact form of these functions is assumed. For example, the multiplication in equation (1) (i.e., the form of function p) could be a summation or some other operation. Therefore, what will be presented below is not regarded as the only choice. Instead, it simply serves as an example to illustrate how the methodology may be implemented in a preferred embodiment.

The following form is chosen for the velocity penalty function for the deceleration signal of a test with impact velocity v:

$$pv(v; m_v) = 1 + \left(\frac{v}{v_F} - 1\right)^2 (1 + e^{-m_v(v/v_F-1)}) \qquad 2$$

here, $v_F$ is the designated control fire velocity, and $m_v \geq 0$ is an adjustable parameter. The function in equation (2) is essentially a modified parabolic curve centered at $v=v_F$. The modification is the exponential term that biases $v<v_F$ cases, with the rate of the bias controlled by the magnitude of $m_v$. The purpose for this bias is to incorporate the philosophy that fire at a velocity lower than $v_F$ is worse than that above with the same deviation from $v_F$. From equation (2) it is seen that $pv \geq 1$ and the equality holds only when $v=v_F$.

Although it may appear more elegant to have a single smooth penalty function for all conditions of fire, it is difficult to construct such a function that satisfies all the requirements. Instead of a single function, the following continuous functions are used for the time penalty, making the entire penalty function piece-wise continuous:

For $v<v_F$:

$$pt=0.0, \text{ if not fire} \qquad 3$$

$$pt(\alpha)=\alpha, \text{ if fire} \qquad 4$$

For $v>v_F$:

$$pt=1.0, \text{ if not fire} \qquad 5$$

$$pt(t, v, \beta, m_t)=\beta(t/ttf(v)-1)^2(1+e^{m_t(t/ttf(v)-1)}), \text{ if fire} \qquad 6$$

In equations (3)–(6), parameters $\alpha$ and $\beta$ are introduced so that the magnitudes of the penalties for the different fire conditions can be adjusted relative to each other. The form of equation (6) which is applicable to a condition of fire at above $v_F$, is analogous to equation (2) with the exponential bias controlled by the parameter $m_t \geq 0$. In equation (6), ttf(v) is the desired time to fire at any given velocity $v>v_F$, which generally decreases with increasing velocity v. This form of the time penalty function embodies the following:

1. a fire at exactly the desirable fire-time ttf for a velocity $v>v_F$ is ideal (pt=0);
2. a no-fire condition at a velocity below $v_F$ is also desirable (pt=0);
3. a fire at a velocity below $v_F$ is to be penalized (equation (4)); and
4. a fire at a time different from the desired fire-time ttf at a velocity of $v>v_F$ is to be penalized, and the longer the fire-time, the higher the penalty (equation (6)).

Equations (2)–(6) apply to each of the entire set of the test signals used to establish the threshold curve. Based on these, following equation (1) by summing up the contribution of the individual signals, the total objective function of the set of signals can be obtained (with a final normalization by the total number of signals). The objective function in this case is non-dimensional, and its magnitude is determined by three sources of information.

First, the choice of the set of input signals affects the value of the final objective function, even though the total number of signals used does not enter directly (since the object function is normalized, as shown in equation (1)). A good choice for the signal set includes signals from tests at the lower and higher neighborhoods of $v_F$, with equal number of signals included for each of these velocities.

Finally, the value of the total objective function also depends on the parameters $[m_v, m_t, \alpha, \beta]$, even after the forms of the penalty and objective functions are all chosen. As will be discussed in the next section, these parameters have to be determined with some discipline (i.e., a certain logical approach).

The penalty function parameters $m_v$ and $m_t$ are used to bias the velocity and time penalties so that lower-than-$v_F$ fire and longer-than-ttf ($v > v_F$) fire are penalized more. To determine reasonable values for these, the following conditions may be imposed:

$$pv|_{v=v_F-\Delta v} = m \times pv|_{v=v_F+\Delta v}, \quad 7$$

$$pt|_{t=ttf+\Delta t} = m \times pt|_{t=ttf-\Delta t}, \text{ for } |v>v_F \quad 8$$

where $\Delta v > 0$ and $\Delta t > 0$ are deviation from the $v_F$ and ttf respectively. In equation (7) and equation (8), m (>=1) is a constant. These equations are used to stipulate that in terms of velocity, a fire occurring at $\Delta v$ below the $v_F$ is m times as "undesirable" as one occurring at $\Delta v$ above the $v_F$, regardless of the time to fire. In terms of time to fire, a triggering with $\Delta t$ time later than the desired time ttf is m times as "undesirable" as one that is $\Delta t$ earlier than ttf. The values of $m_v$ and $m_t$ can be determined after m, $\Delta t$, and $\Delta v$ are chosen. For example, $m_v = m_t = 2.2$, can be obtained if it is assumed that $\Delta t = (0.25)$ttf and $\Delta v = (0.25)v_F$. It should be understood that different requirements can be used, and therefore, different weightings of events in the penalty equations may be used.

The choice of the values of $\alpha$ and $\beta$ can be rationalized in the following way. The time penalty function pt in equation (1) can be thought of as a weight to the velocity penalty function pv. Based on equations (3)–(6), these two parameters regulate the relative magnitude of the time penalty weights of the four different fire conditions given there. If we take the case of equation (5) with pt=1.0 as a base value, the conditions of equations (4) and (6) can be given relative weights through setting the parameters $\alpha$ and $\beta$. It can be assumed that for $v > v_F$, if the airbag does not fire, its weight should be the same as that for $v < v_F$ when the airbag does fire undesirably. This assumption, in combination with equations (4) and (5), gives:

$$\alpha = 1. \quad 9$$

For determining $\beta$, it can be assume that for a given $v^* > v_F$ a fire condition with a fire-time later than the desired time to fire is as "undesirable" as the case where it does not fire at all:

$$\beta(t/ttf(v)-1)^2(1+e^{mt}_{(ttf(v)-1)}) = 1.0. \quad 10$$

It is further assumed that the above equation holds for a late fire of t=2ttf, with a known $m_t$, $\beta$, can now be determined. For example, for $m_t = 2.2$ as determined above, $\beta = 0.1$ will be obtained, and with t=1.5ttf and t=3tff, $\beta = 0.89$ and 0.003, respectively. It is noted that the condition represented by equation (10) has a physical significance. Its left side expresses the penalty for late fire which reduces the effectiveness of the protection and possibly poses a risk to the occupant who would be close to the airbag module, especially for an unbelted occupant; and its right side (as the explanation of equation (5) suggests) is the penalty for no airbag deployment for an impact with velocity above the control velocity. Therefore, the equation reflects the assessment of the relative importance of two undesirable fire conditions, and it attempts to balance the "airbag safety risk" with "the no protection risk". Such balances are needed if the objective function is to have the capability to evaluate the fire event comprehensively and coordinately.

Figure 2A:
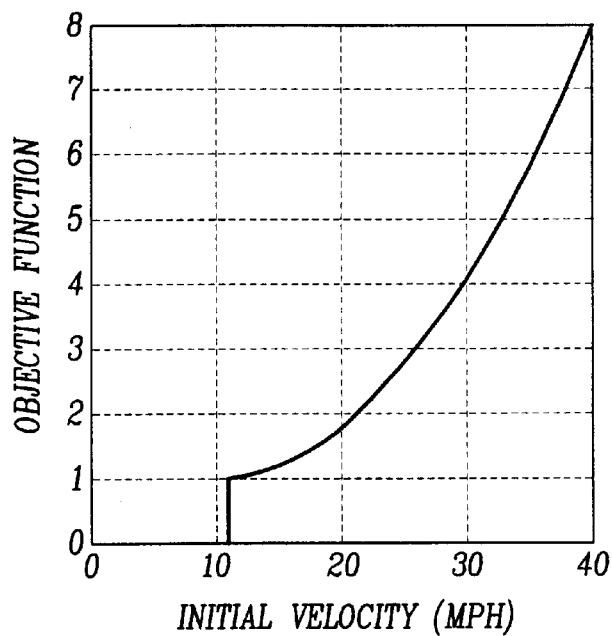
FIGS. 2(a–b) show the objective function in velocity-time space for no-fire and fire cases.
Figure 2B:
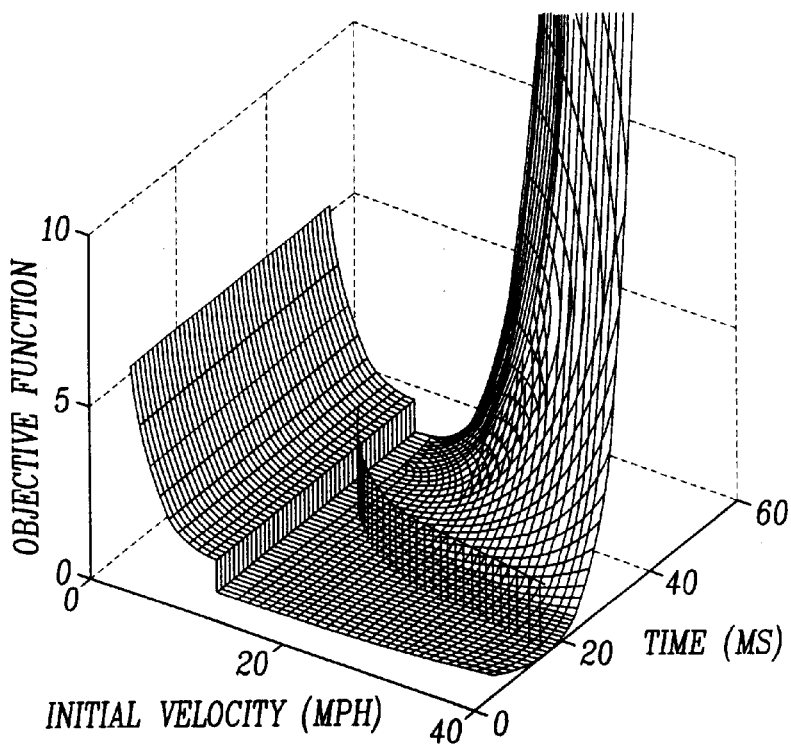

Now, the time and velocity penalty functions have been fully developed. With the parameters $[m_v, m_t, \alpha, \beta] = [2.2, 2.2, 1.0, 0.1]$ chosen based on the given requirements, the penalty functions can be visualized. FIGS. 2(a–b) are graphical representations of the penalty and objective functions in impact velocity vs. fire-time space.

Figure 3:
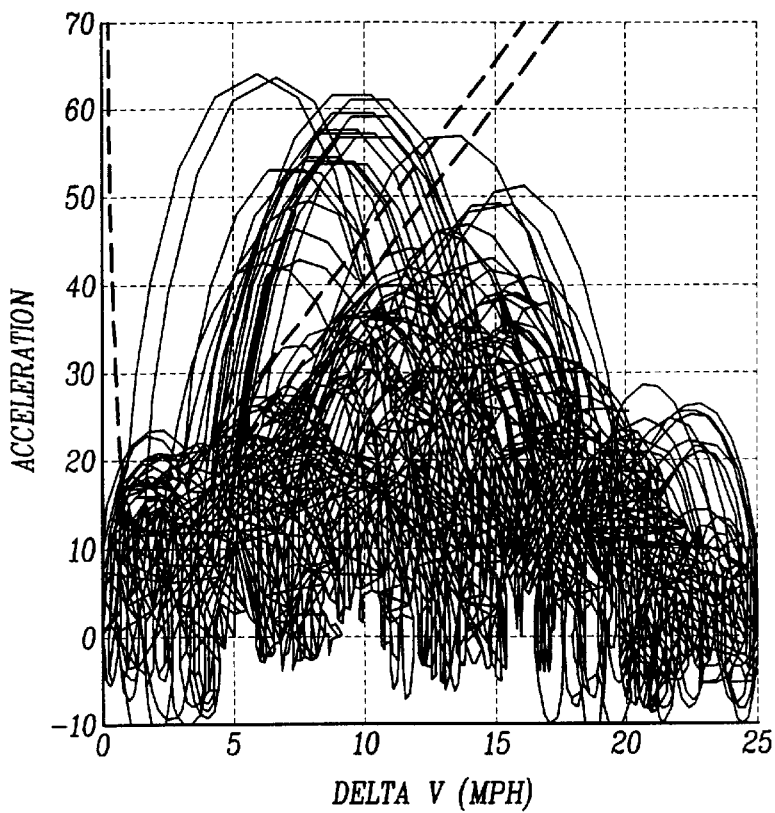
FIG. 3 shows signals and thresholds in deceleration-delta v space.

The airbag fire decision is made based on a threshold curve in the fire criterion space. What constitutes this space depends on the logic behind the fire control. For example, if the criterion is simply the level of the deceleration, then this "space" is one-dimensional, i.e., the acceleration magnitude axis, with the threshold (curve) being a point on this axis. Most often, to account for different inadvertent fire events along with the actual tests, a two-dimensional space is used. In this example, we have chosen the deceleration (a)-velocity change ($\Delta v$) (integration of the deceleration over time) space as the fire decision. The threshold therefore takes the form of a curve $a^{th} = f(\Delta)$ in the a-$\Delta v$ space. Although in general, the threshold curve does not need to be smooth (it does need to be continuous), it is advantageous to have a threshold curve that can be represented by a simple smooth function. A primary advantage is that it may be parameterized, which aids in computations. A plot of the deceleration signals that are generated through the procedure are present along as its two different threshold curves are presented in acceleration/velocity space in FIG. 3. The following is the parameterized threshold curve:

$$a^{th} = k_1/\Delta v + k_2 + k_3 \Delta v, \quad 11$$

where $a^{th}$ is the threshold value of the deceleration at a given velocity change $\Delta v$, and $k_1$, $k_2$ and $k_3$ are three parameters that define the threshold curve. The general shape of such a threshold curve is plotted in FIG. 3 with the deceleration signals that are generated through the procedures discussed previously. The function for equation (11) has been chosen with several basic requirements to the threshold curve in mind. The first term is chosen so that the threshold curve has an initial descending portion in the space. This is normally needed to provide immunity to events with high deceleration over a very short duration of time (therefore, low $\Delta v$) which are generally generated by either electronic noise or local impact at or near the sensor mounting location. The second term is included to provide a degree of freedom that controls the elevation of the threshold curve in the vertical direction. Lastly, the third term is added to allow the threshold curve to have an upward turn in large $\Delta v$ (or equivalently, longer time) which is generally necessary to avoid cutting into signals of $v < v_F$ late (which will occur if the threshold needs to be at a rather low acceleration level to provide sufficiently short fire-times).

Using equations (1)–(6) and (11), it is now possible to produce response surfaces of the objective function as a function of the parameters of the threshold curve, and then to examine their characteristics. For a given set of threshold curve parameters, each of the set of calibration signals will produce a fire condition: fire or not fire, and if fire, the fire-time. These, along with the impact velocity of the signal, produce an objective function contribution of that particular signal, which is essentially a number taken off FIGS. 2(a-b). The sum of the contributions from all the signals gives the total objective functions.

Figure 4A:
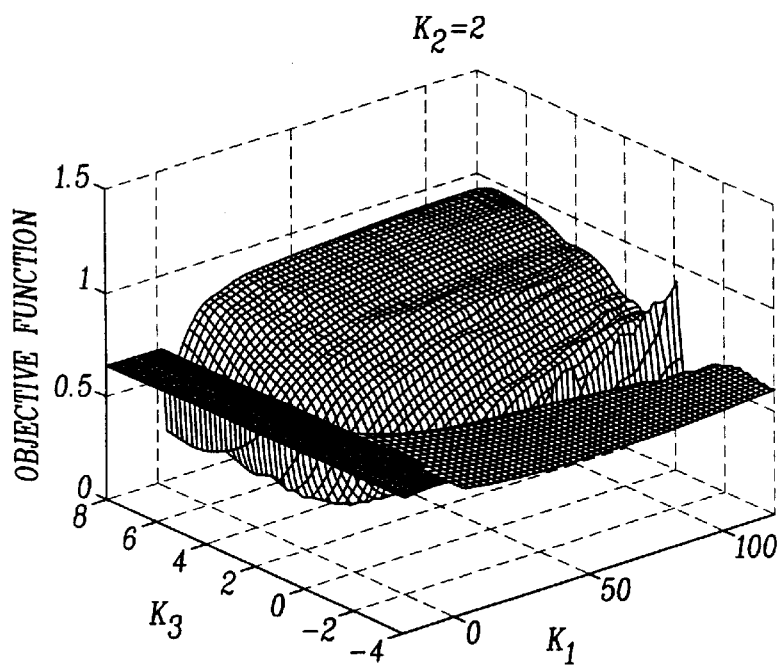
FIGS. 4(a–c) show the objective function response surfaces in $k_1$–$k_3$ space with different $k_2$ values.
Figure 4B:
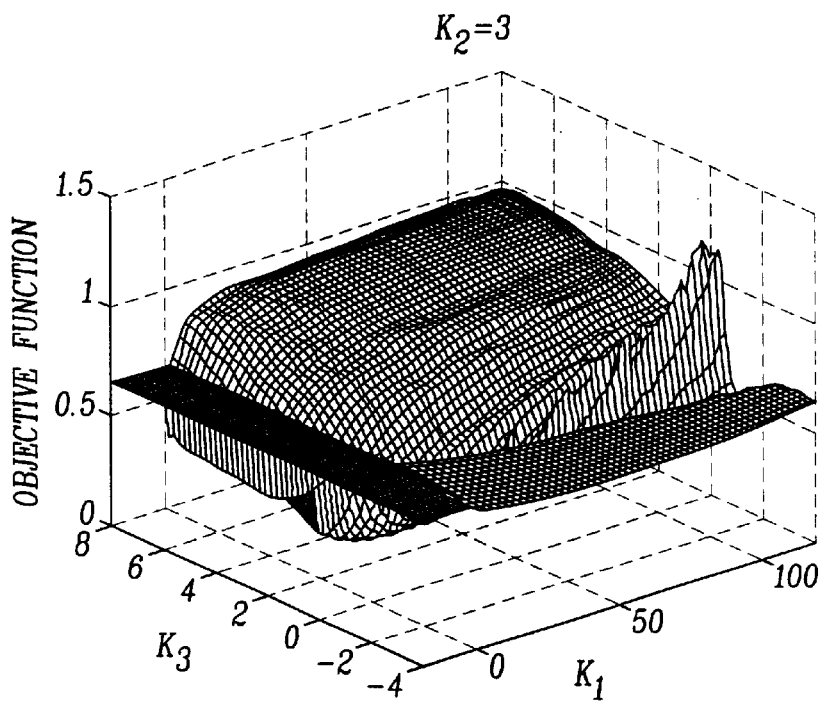
Figure 4C:
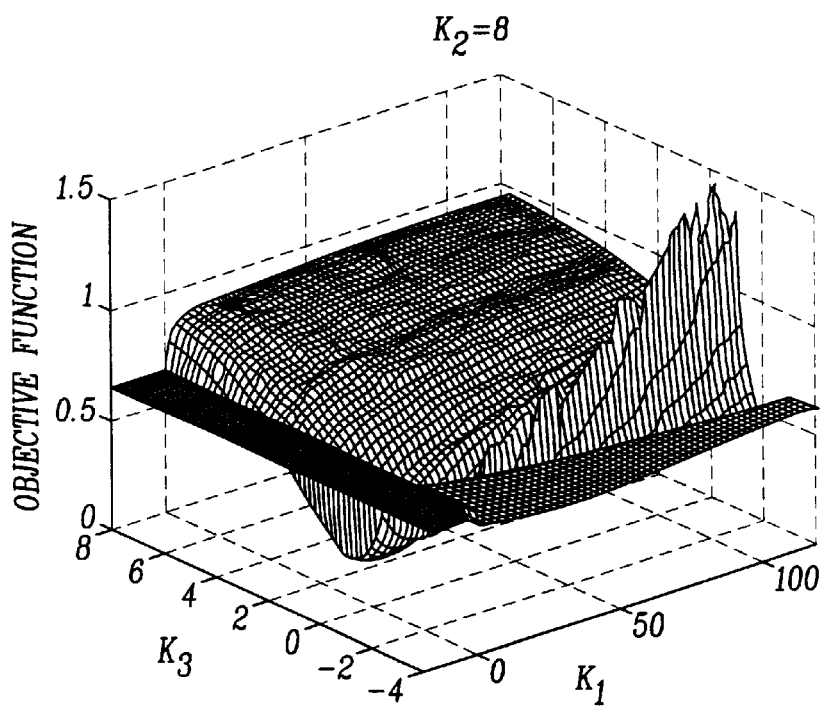

Using the parameter set of $[m_v, m_t, \alpha, \beta]=[2.2, 2.2, 1.0, 0.1]$, specifying $v_F=13$ mph, and varying the threshold curve parameters in a certain range, the response surface of the objective function is computed and presented in FIGS. 4(a–c). The value of the parameter $k_2$ was set to $-2$ (FIG. 4(a)), 3 (FIG. 4(b)) and 8 (FIG. 4(c)). The parameter $k_2$ changes the response surface in a rather simple way. It is also noted that since surfaces with different $k_2$ values actually cross each other, there is a certain degree of redundancy in retaining it. This may also be understood from another perspective. In the limited region of a-$\Delta v$ in which the threshold curve intersects the signals, a threeparameter threshold may effectively be very close to a two-parameter without $k_2$ (or $k_2=0$), in terms of fire-time. There is interest in restricting the number of threshold parameters to two. It is easier to present the response surface in the following in a $k_1$–$k_3$ space; and in terms of searching the optimal point, there is advantage in both computational time and search reliability. These will be discussed in the next section. For now, the threshold curve is restricted to the $k_1$–$k_3$ parameter case for a more detailed discussion.

Figure 5A:
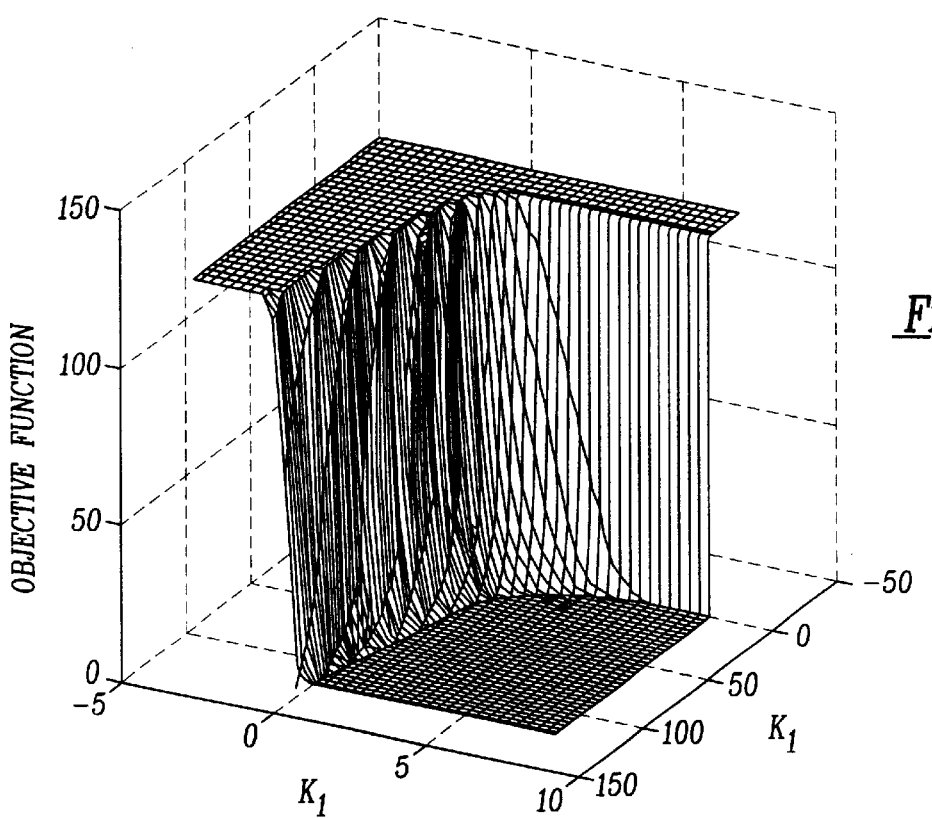
FIGS. 5(a–b) show the objective function response contribution from signals of a given velocity.
Figure 5B:
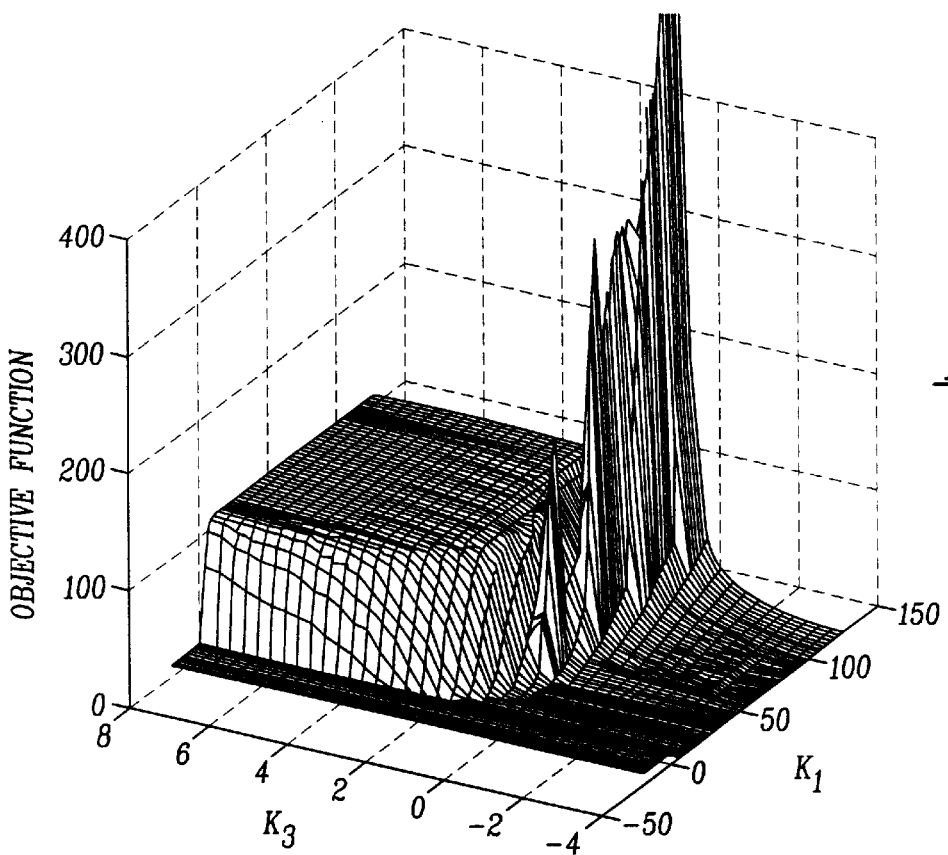

It is interesting to examine the contribution of signals at a given impact velocity to the total objective function. FIGS. 5(a–b) show the contributions of $v=8$ mph ($<v_F=13$) and $v=14$ mph ($>v_F=13$ mph). In this application, the objective function is normalized by the total number of signals only in the case of the total objective function. These graphs show that for $v<v_F$, towards the areas of $k_1$–$k_3$ parameter space that gives high thresholds (high $k_1$ and $k_3$ values), the objective function contribution is zero, because none of the signals would fire, which is desired. On the opposite region where low thresholds are produced, a high penalty is produced since all the signals will fire with such $k_1$ and $k_3$ values. In the particular case shown, the objective function is the number of signals (100) multiplied by $\alpha(=1.0)$. The response surface of $v>v_F$ may be understood similarly. Its most important characteristic is that the elevated area (penalized area) in the $k_1$–$k_3$ space is the high threshold area, contrasting the $v<v_F$ case. Another characteristic of the $v>v_F$ response surface is the high peak somewhat aligned with the higher $k_1$ value direction. A careful examination shows that this is a result of the penalty imposed on the longer-than-desired fire-time for the $v>v_F$ fire condition. This area is controlled by the parameters $\beta$ and $m_t$, as will be shown later.

Figure 6A:
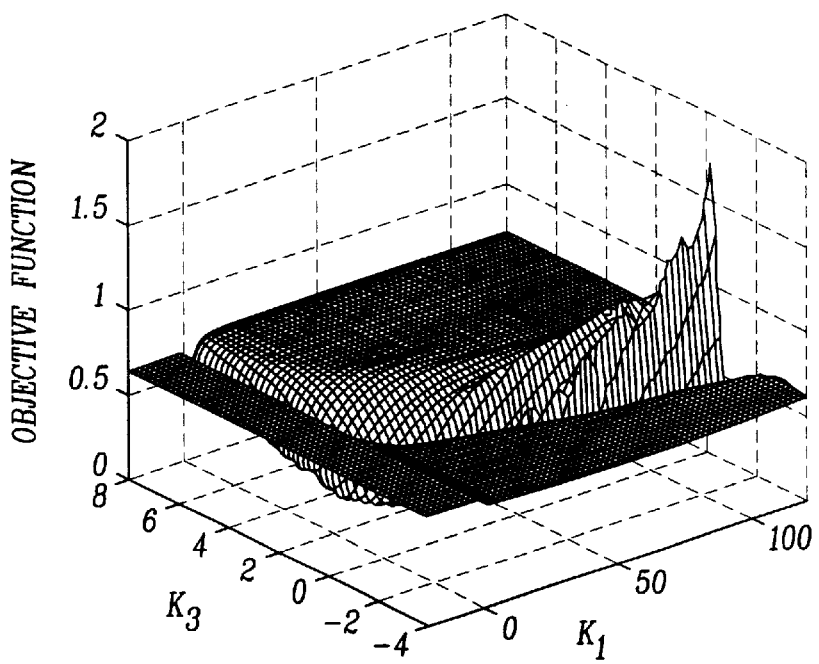
FIGS. 6(a–f) show the objective function responses with calibration signals.
Figure 6B:
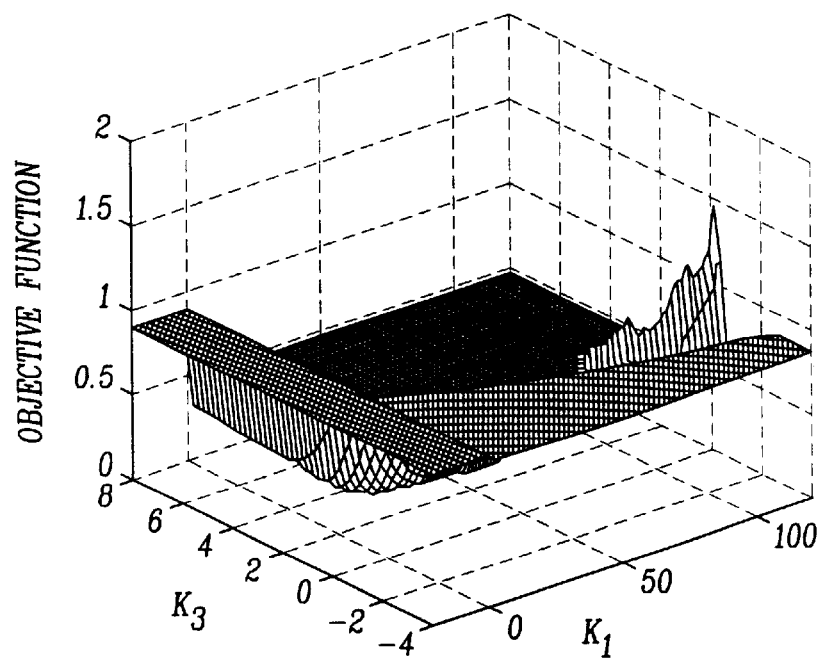
Figure 6C:
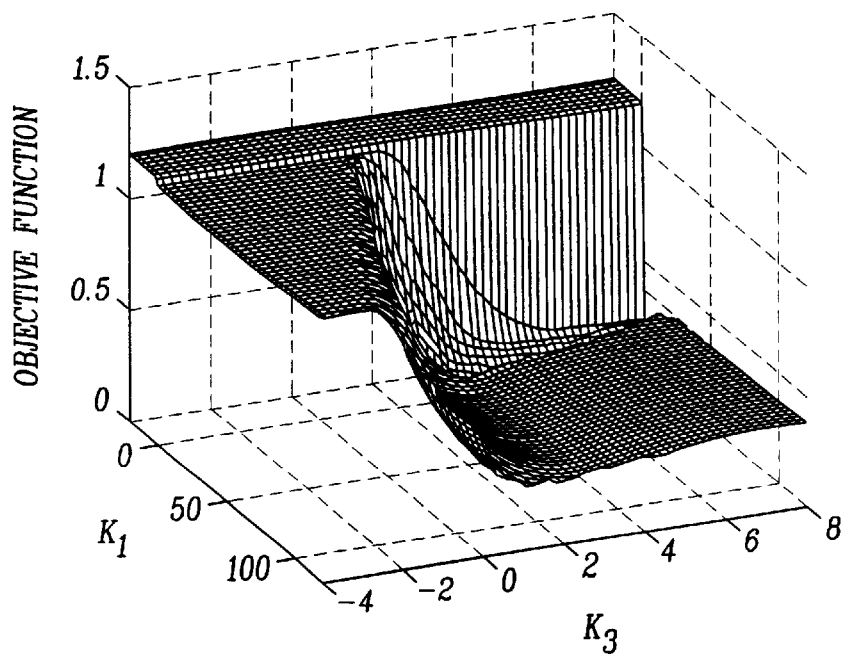

With the objective function response surfaces from the individual impact velocities, the total objective function is simply the sum of these, as show in FIGS. 6(a–f) in the case of using v=6, 8, 10, 12, 14, 16 and 18 mph (FIGS. 6(a) and (b)) and the case of using v=6, 8, 10, 12, 14, 16, 18, 20, 22, 25 and 30 mph (FIG. 6(c)). The total objective function surface features a crescent-shaped area in the $k_1$–$k_3$ space where its values are low. The lowest point in this area then represents the optimal fire condition as gauged by the current objective, penalty, and threshold curves and their parameter settings. FIG. 6(d) is a contour plot of the response surface shown in FIG. 6(c).

Figure 6D:
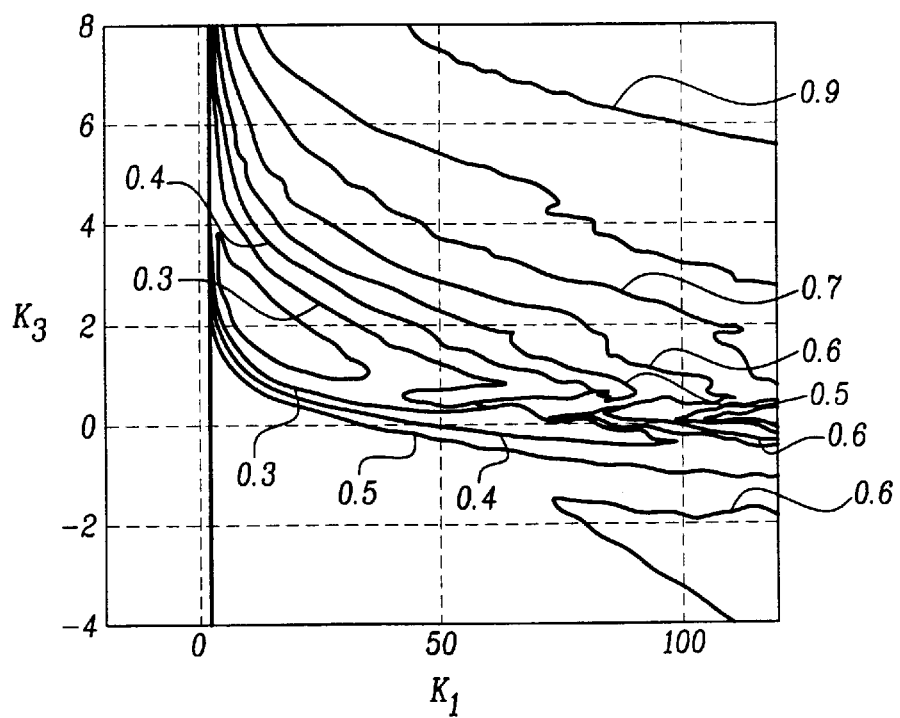
Figure 6E:
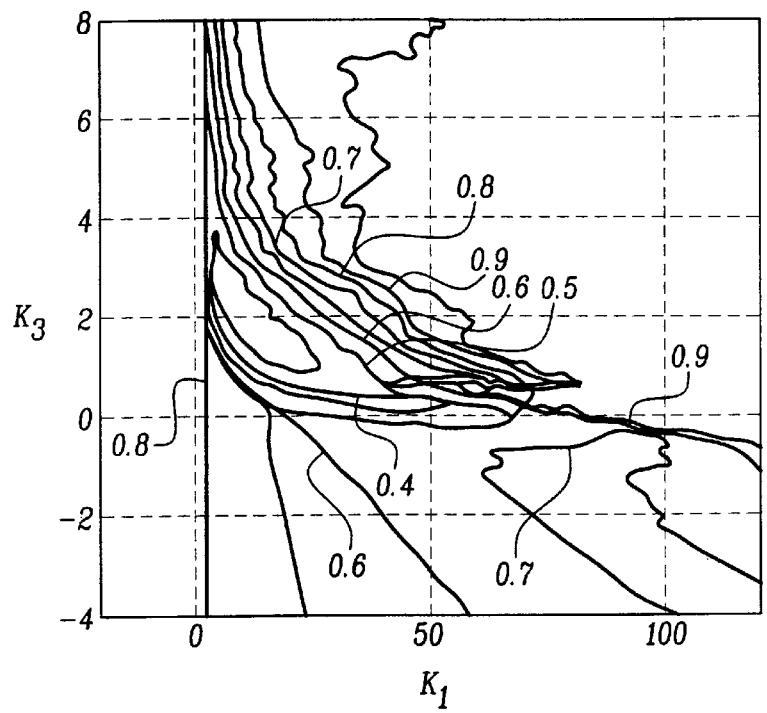

FIG. 6(e) is produced using the same input signals as FIG. 6(d) but with the parameter $\beta$ changed from 0.1 (FIG. 6(d)) to 0.3 (FIG. 6(e)). A comparison between the two figures shows that this change in the parameter setting affects the response surface; however, the essential characteristic, the presence of the optimal area, remains.

Figure 6F:
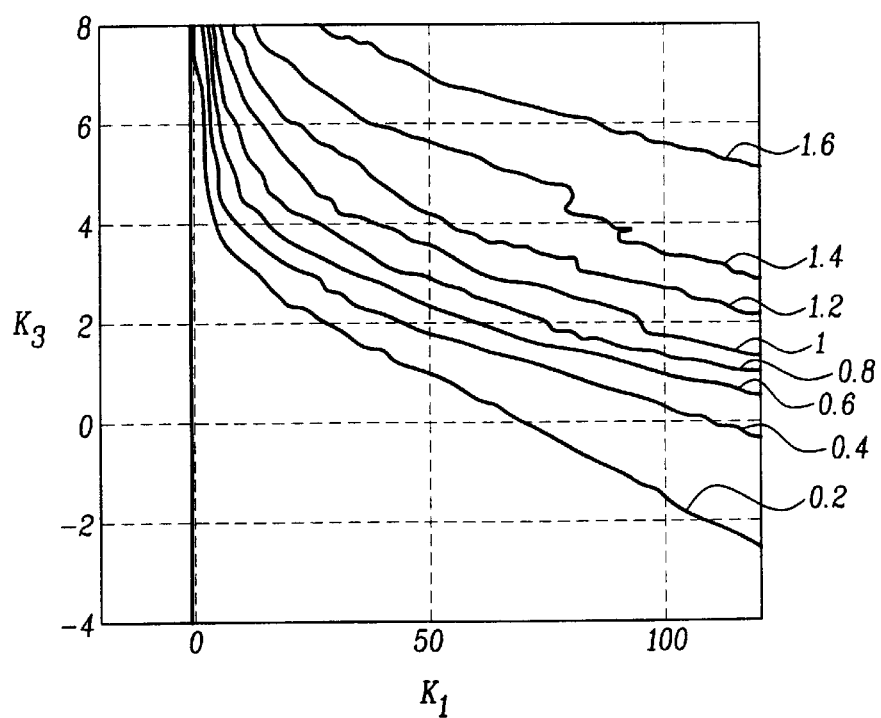
Figure 7A:
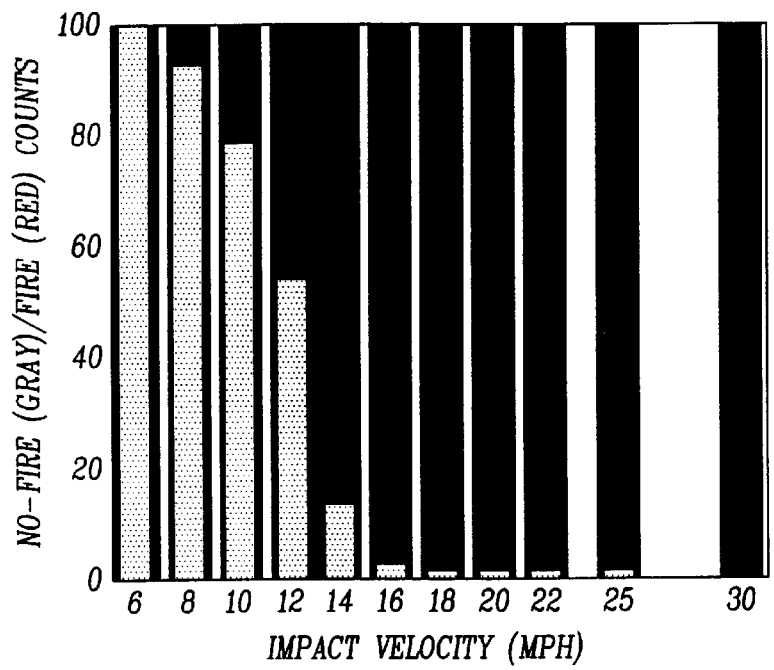
FIGS. 7(a–d) show the optimal fire conditions determined from response surfaces.
Figure 7B:
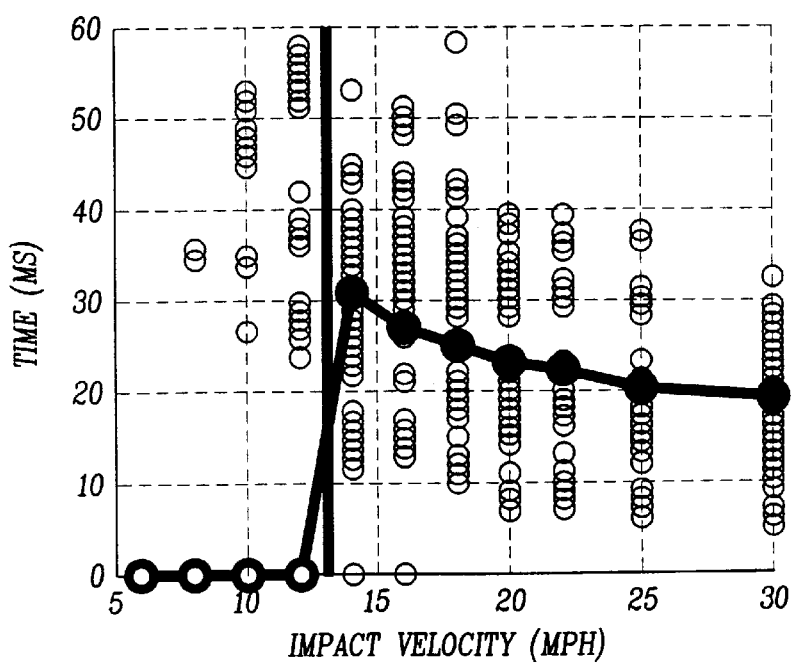
Figure 7C:
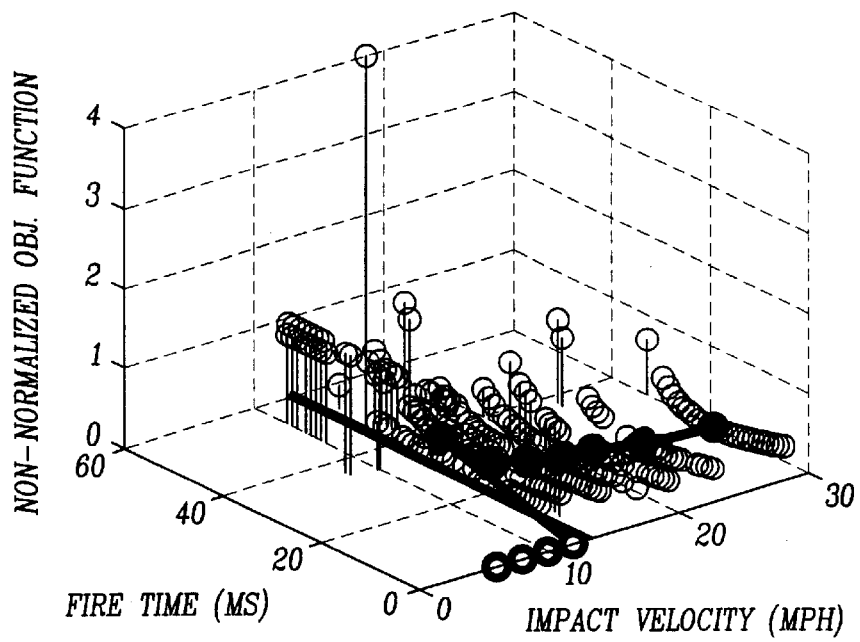
Figure 7D:
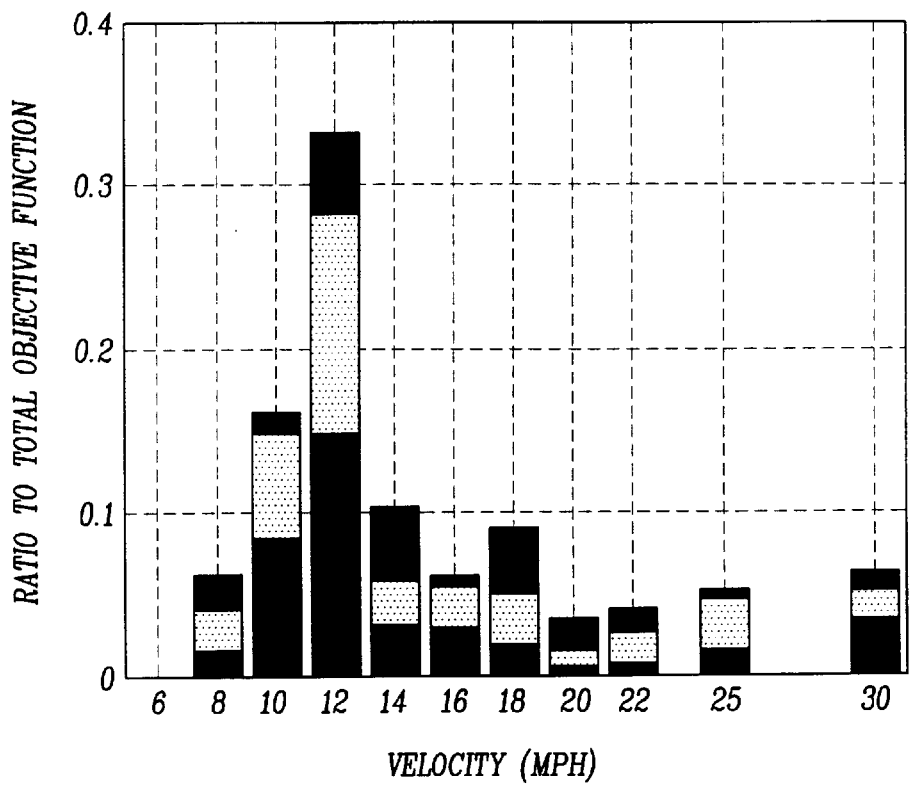
Figure 8A:
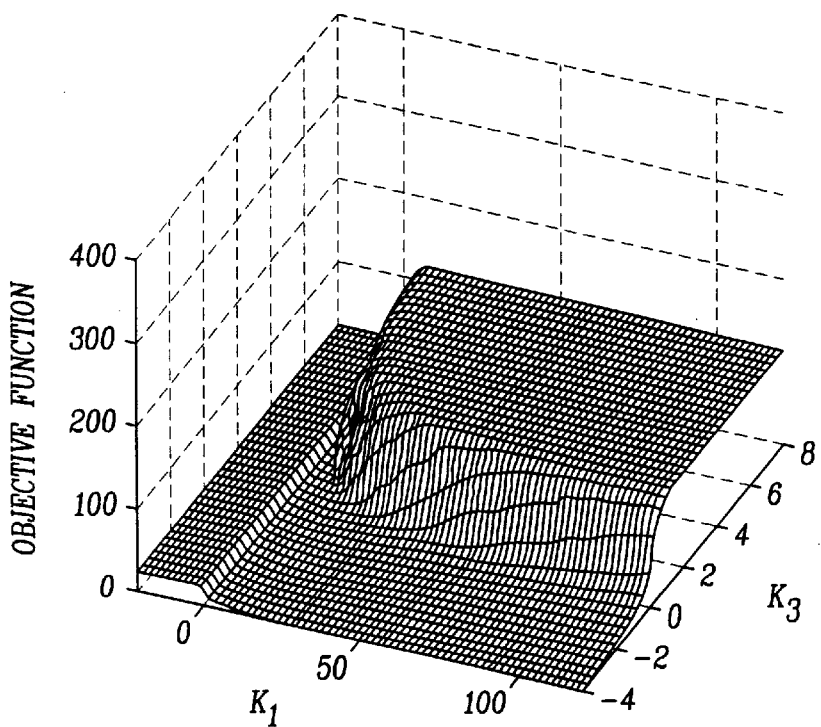
FIGS. 8(a–d) show the effects of penalty function parameters.
Figure 8B:
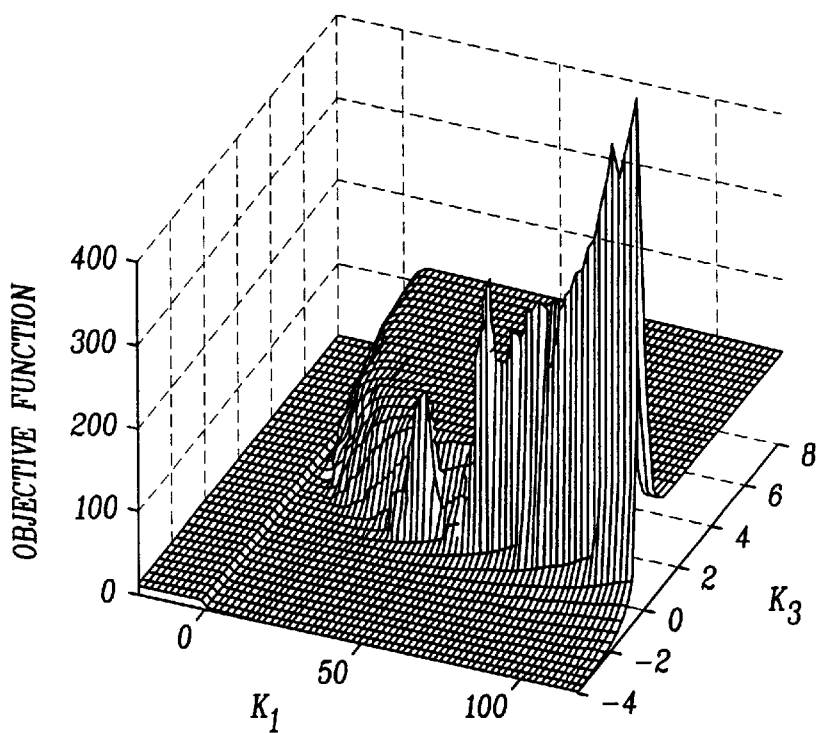
Figure 8C:
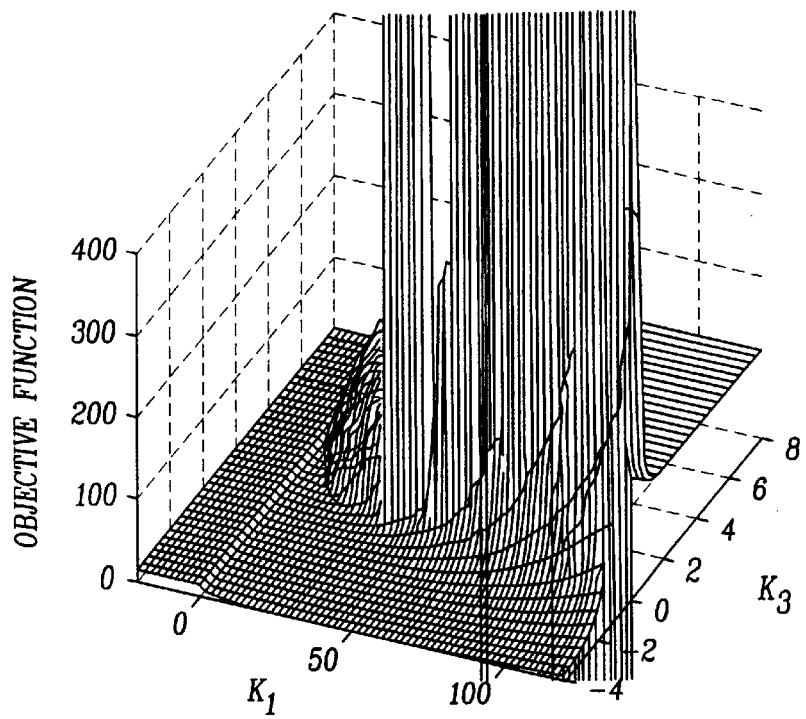
Figure 8D:
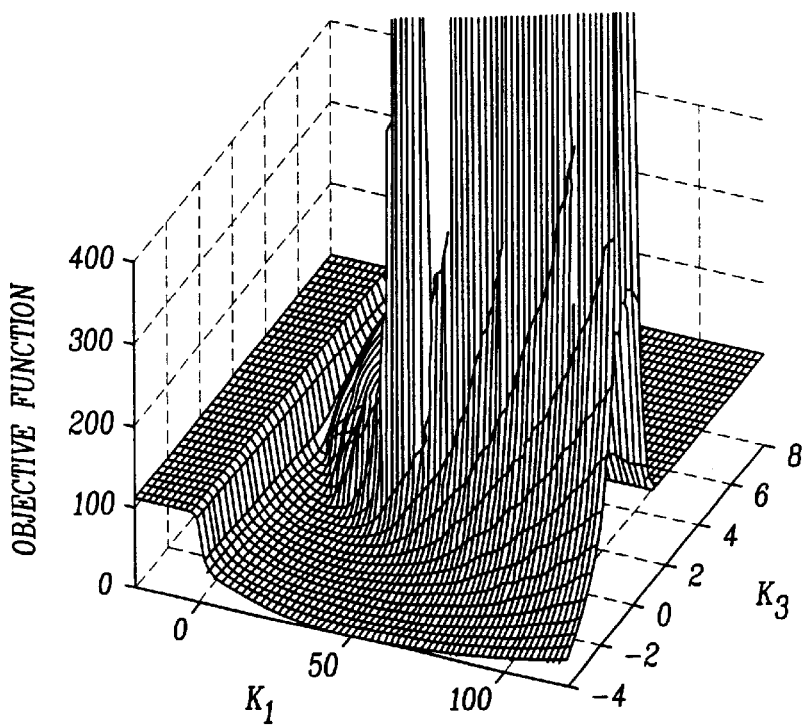

The change in the response surface due to the addition of signals at other velocities may be examined by subtracting response surfaces of FIGS. 6(c) and 6(a), as show in FIG. 6(f). The signal-number normalized contour shows that the change due to the incorporation of new signals is more significant away from the optimal region.

The optimal combination of the threshold curve parameters may be determined by locating the lowest point of the response surface, and the corresponding fire condition may therefore be determined. For example, FIGS. 7(a–d) show the details of the optimal fire condition in FIG. 6(c). The fire condition appears to be reasonable in terms of satisfying our requirements.

The parameters in the penalty functions are built in with the objective to shape the response surface so that it reflects the requirements for the airbag fire control. Some numerical examples are now presented to provide a visualization of the effect of the penalty function parameters.

Figure 9A:
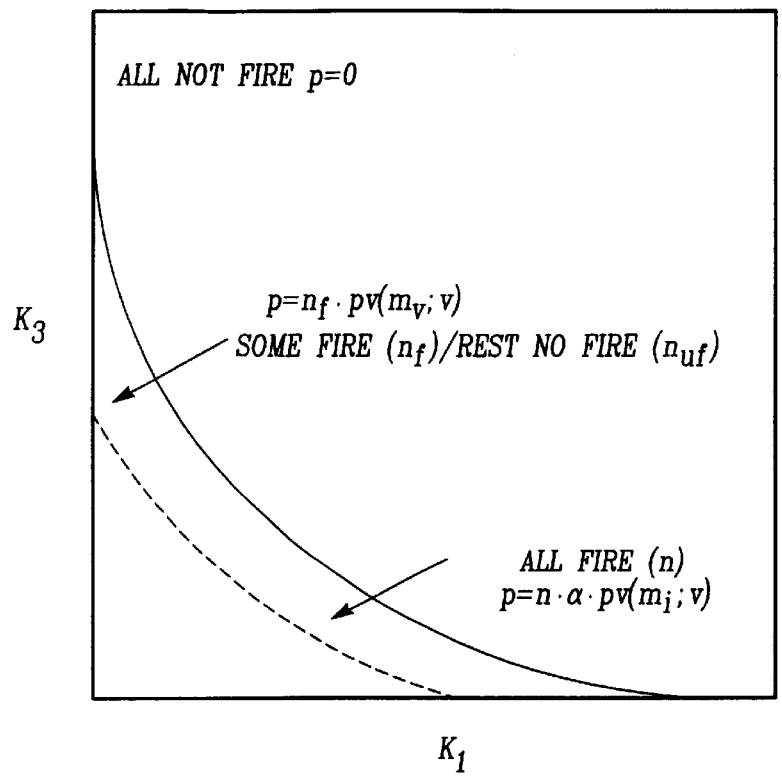
FIGS. 9(a–b) show schematic diagrams illustrating the influence of regions of penalty function parameters.
Figure 9B:
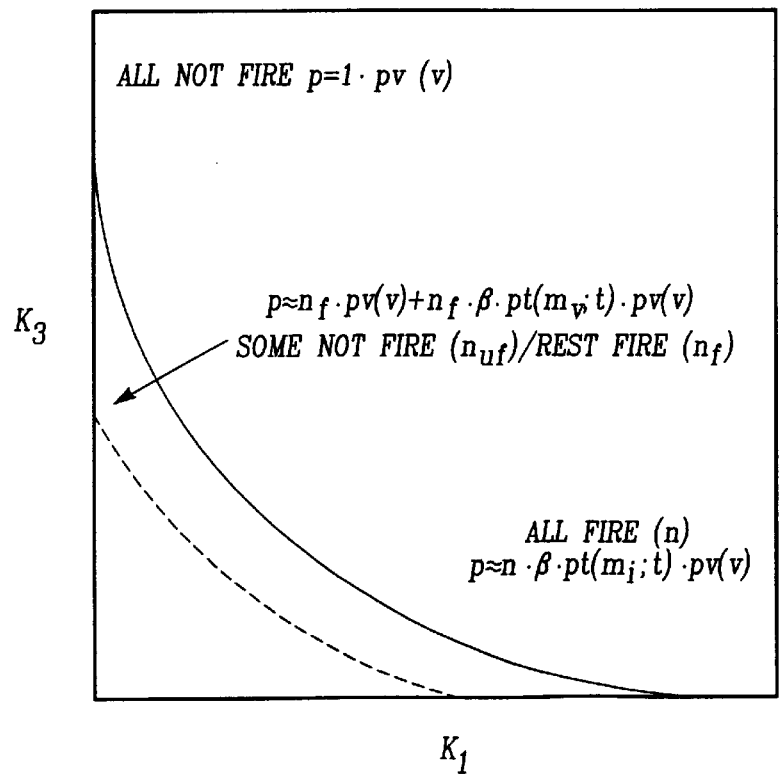

The effects of $m_t$ and $\beta$ on the response surface of signals from a given velocity (e.g., v=14 mph) are shown in FIGS. 8(a–d). The parameter $m_t$ is seen to heavily penalize the fire-time with its emphasis on longer fire-time, as a comparison of FIGS. 8(a), (b), and (c) shows ($m_t$ changes from 0.0 to 1.0 to 2.2). $\beta$ is seen to have a broader area of influence than mt in that the shorter fire-time events are also penalized more as it increases, as shown between FIGS. 8(b), (c) and (d). Therefore $m_t$ and $\beta$ can be used to achieve desirable penalty in terms of fire-time in two different ways. The effects of the parameters $m_v$ and $\alpha$ are similar. As a summary of these effects, FIGS. 9(a–b) show a schematic diagram in $k_1$–$k_3$ space for the fire and no-fire cases. The parameters are marked in areas where they exert an influence.

Figure 10A:
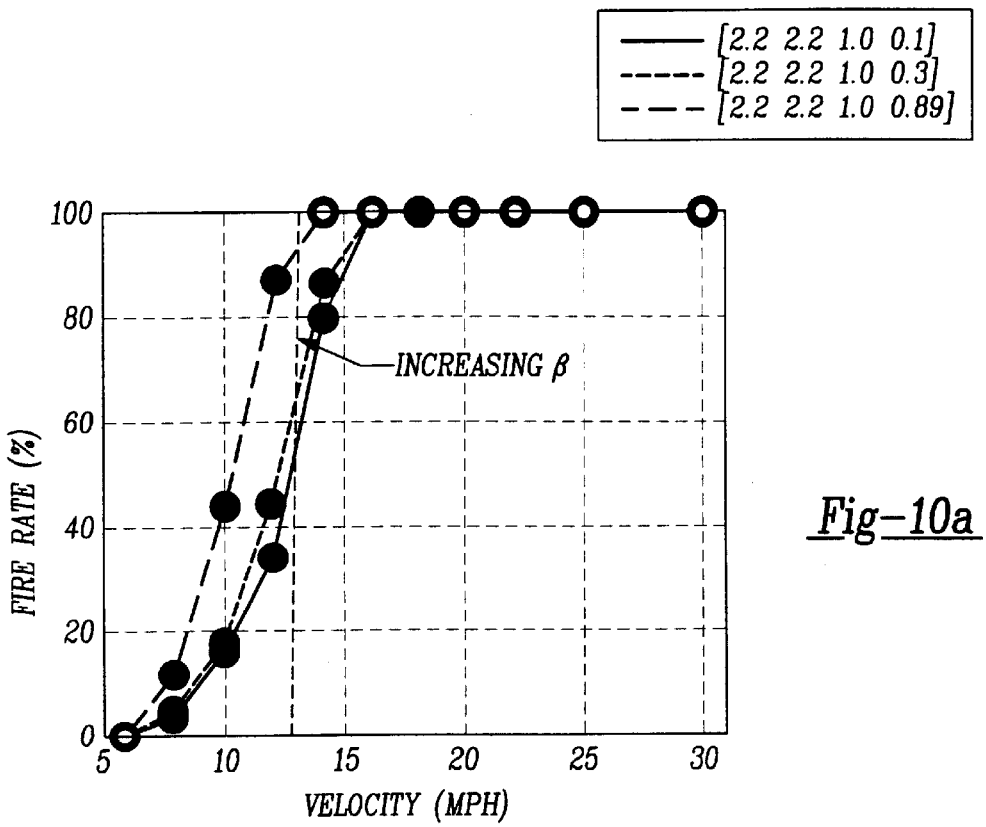
FIGS. 10(a–b) show the effect of increasing parameter beta of the fire-rate.
Figure 10B:
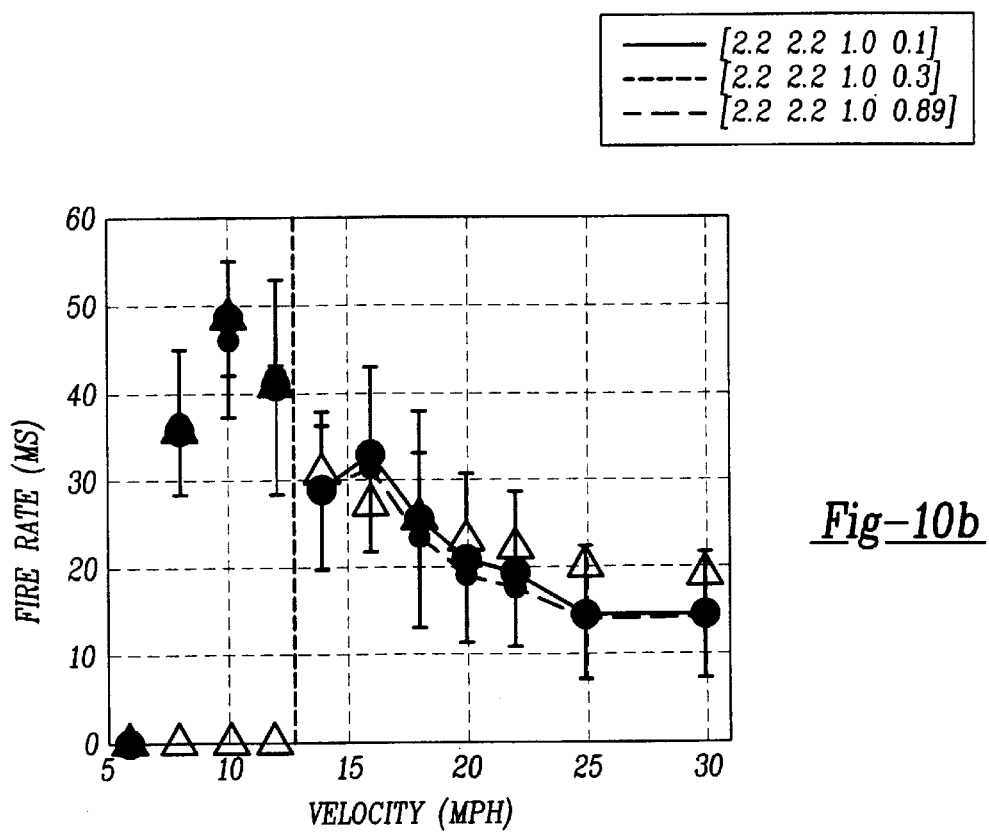

An example is studied of achieving the desirable fire condition control by adjusting the penalty function parameters. In this case, the parameter $\beta$ is changed from the base condition of 0.1 to 0.3 and 0.89. The valley of the response surface in $k_1$–$k_3$ space is pushed towards the shorter fire-time range. FIGS. 10(a–b) show the fire-time and fire-rate of the optimal point of each of the two cases. On an average, the case with a higher $\beta$ values (0.89) pushes the optimal solution to a point with better fire-time, but slightly compromised fire-rate.

In the above, the optimal threshold curve parameters are obtained through finding the minimum after the objective function is fully mapped out in the feasible sub-region of the parameter space. By developing the threshold curve and the objective function in the previous manner, the optimal threshold curve parameters may now be found using an automated search procedure. This procedure will generally be much more efficient than manual searching. In choosing or developing an algorithm for this purpose, the behavior of the objective function needs to be examined.

As a direct consequence of its construction (equations (1)–(6)), the objective function is continuous relative to its variables (the threshold curve parameters). It is, however, non-smooth, since the condition of intersection of the threshold curve and the signals (giving the fire condition) in the fire-space is a discrete event and the penalty for the different condition is not continuous with different fire conditions. Furthermore, although it appears to have a single, global minimum at the scale of observation shown in FIGS. 6(c) and (d) (the "crescent" area), it in fact features numerous local minima, much like a low frequency wave with high frequency, low magnitude oscillatory components superimposed. The non-smooth nature is believed to preclude the use of the more efficient gradient based search algorithms typically used in optimization, and leave us with the function value comparison type of algorithms. The simplex search algorithm is chosen for the search procedure. This algorithm must be slightly modified to prevent convergence to a local minimum. The modified simplex search algorithm may be implemented using known search tools, such as the Optimization Toolbox of the program Matlab® (v5.1).

Figure 11A:
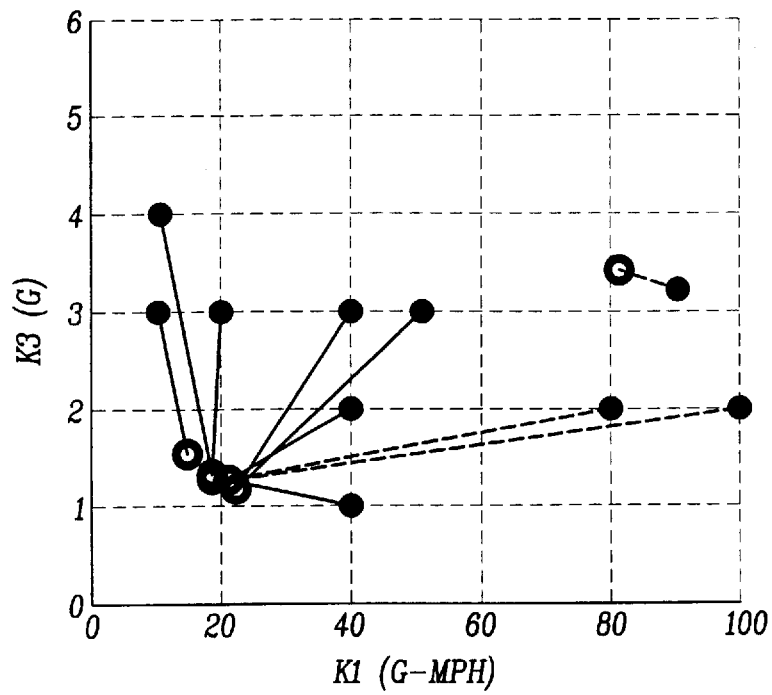
FIGS. 11(a–h) show the results of optimal point searches with different parameter settings.
Figure 11B:
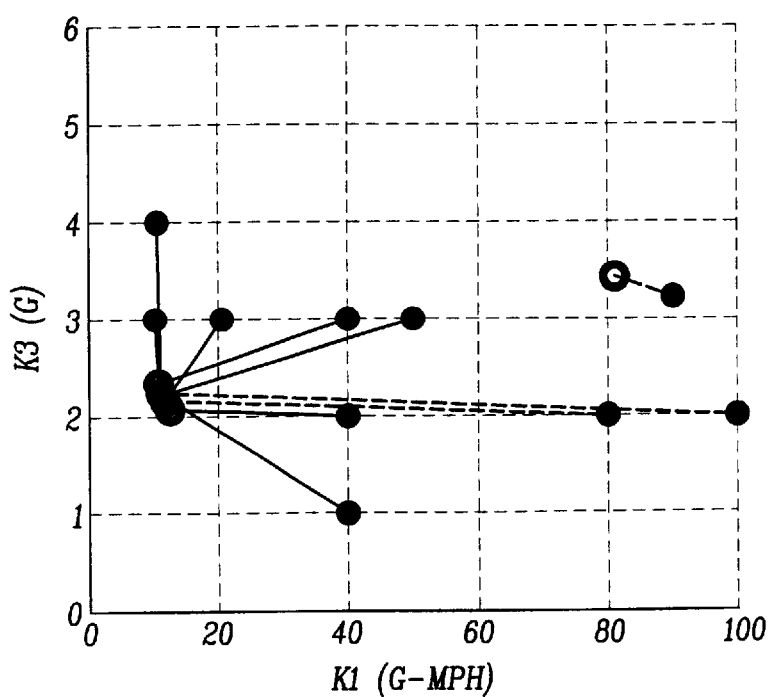
Figure 11C:
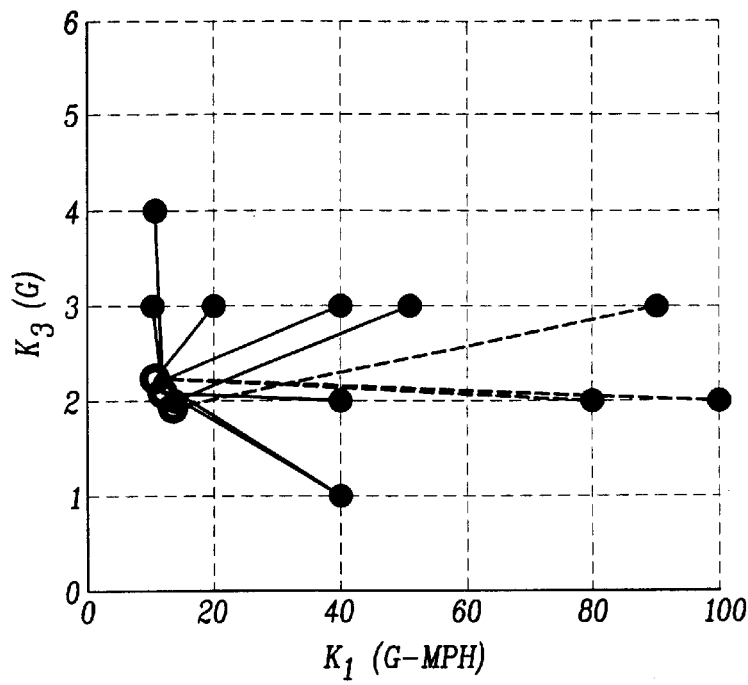
Figure 11D:
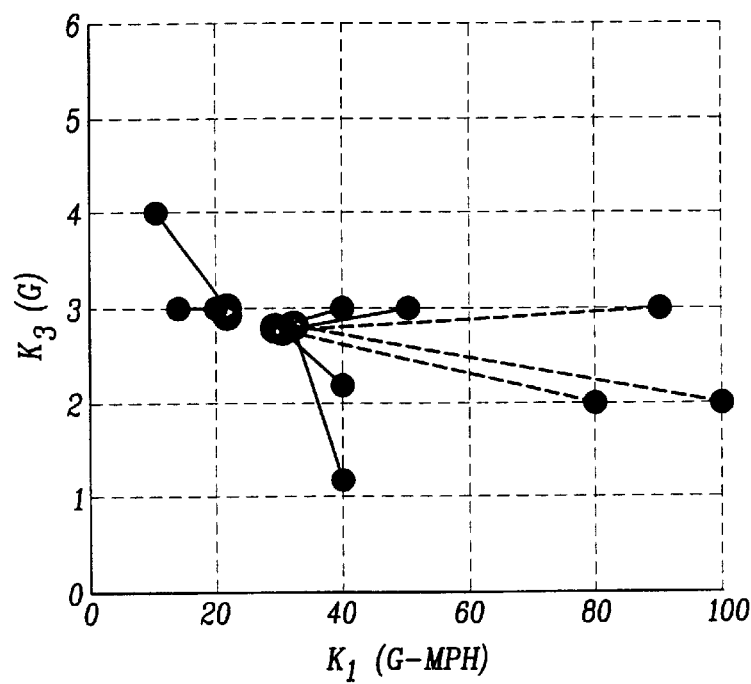
Figure 11E:
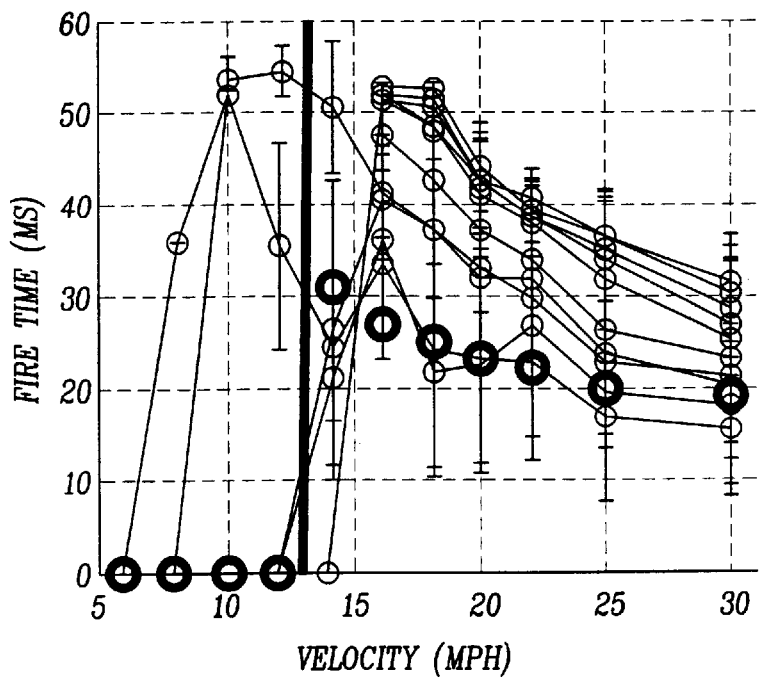
Figure 11F:
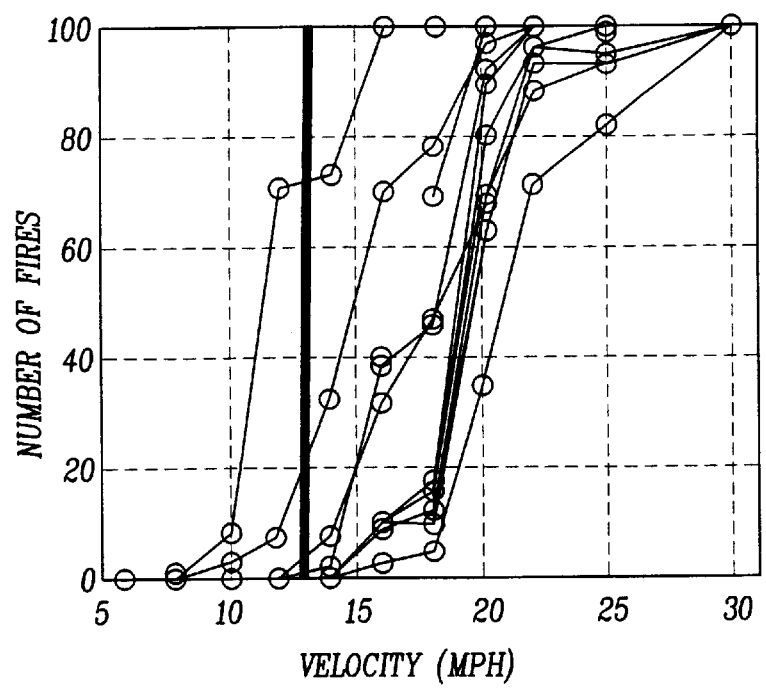

The performance of the search algorithm is examined by running ten searches; the ten starting points are arbitrarily chosen. By examining the objective function response surfaces as show in FIGS. 6(a–b), it can be seen that the starting points should be chosen away from the plateaus. These are not difficult to avoid, because they correspond to threshold curves that intersect none of the signals or all of them with zero time to fire. Results of the searches with different $v_F$, different settings and different collections of signals are shown in FIGS. 11(a–h). In FIG. 11(a) and (b), signals from initial velocities of $v_o$=6, 8, 10, 12, 14, 16 and 18 mph are used with the penalty function parameter setting of [2.2, 2.2, 1.0, 0.1]. These two cases differ in the setting of the control velocity, with FIG. 11(a) having $v_F$=11 mph and FIG. 11(b) having $v_F$=13 mph. The results show that in both cases, except with one starting point value, the search converges to the global optimal area. FIGS. 11(c) and 11(d) use the same penalty parameter setting, and signals with $v_o$=6, 8, 10, 12, 14, 16, 18, 20, 22, 25 and 30 mph. The control velocity was set at 13 mph and 19 mph respectively. The starting points for the search is the same in these two cases as that in FIGS. 11(a) and (b). In these cases, however, as a result of the addition of the signals, the non-converging search ends up converging as well. These examples show that the modified search tends to lead to the global optimal area. In addition, the same set of penalty function parameters tends to be useful for cases with different signals and different control velocities. This is desirable for two reasons. First, it is convenient to be able to use a set of parameters for cases that are similar. Second, since the initial determination of these parameters has a high degree of freedom, the search and the optimal result should not be very sensitive to the parameter settings.

Figure 11G:
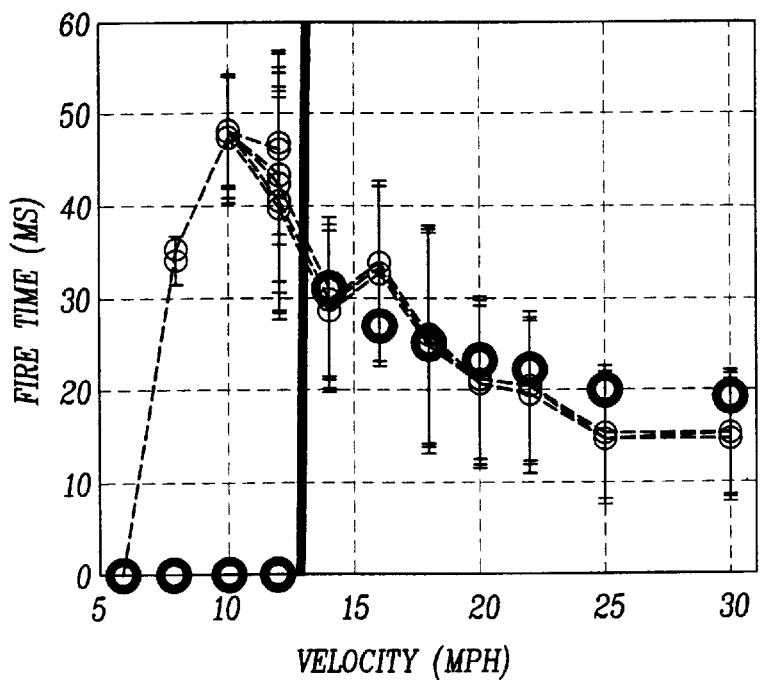
Figure 11H:
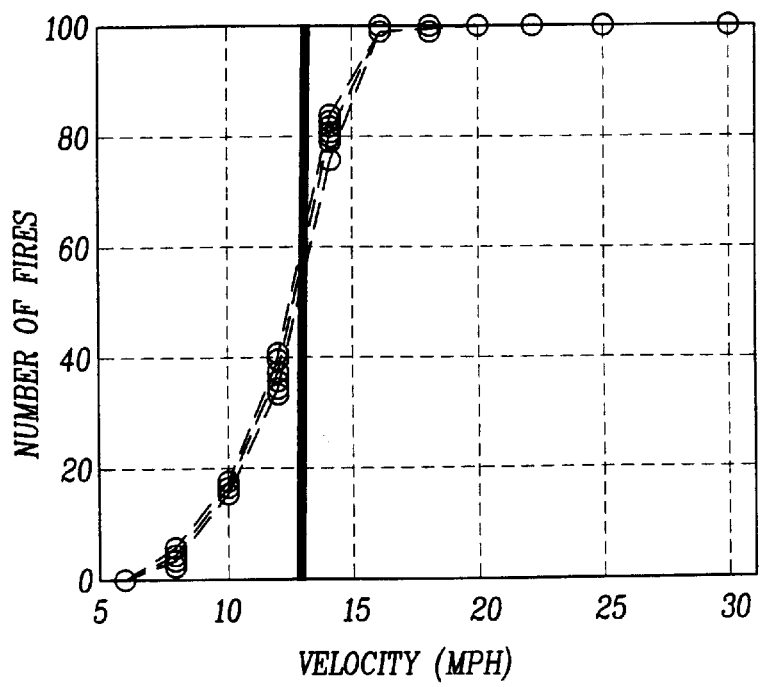

The fire conditions of the initial and final converged points for the case of FIG. 11(c) are given in FIGS. 11(e)–(h). FIGS. 11(a)–(d), show that the converged points are not unique (not a single set of $k_1$–$k_3$ values). FIGS. 11(g) and (h), show the search-produced "optimal" conditions may be considered practically the same. The objective function values of these conditions are extremely close, i.e., the response surfaces are essentially flat in the area of these points.

Figure 12A:
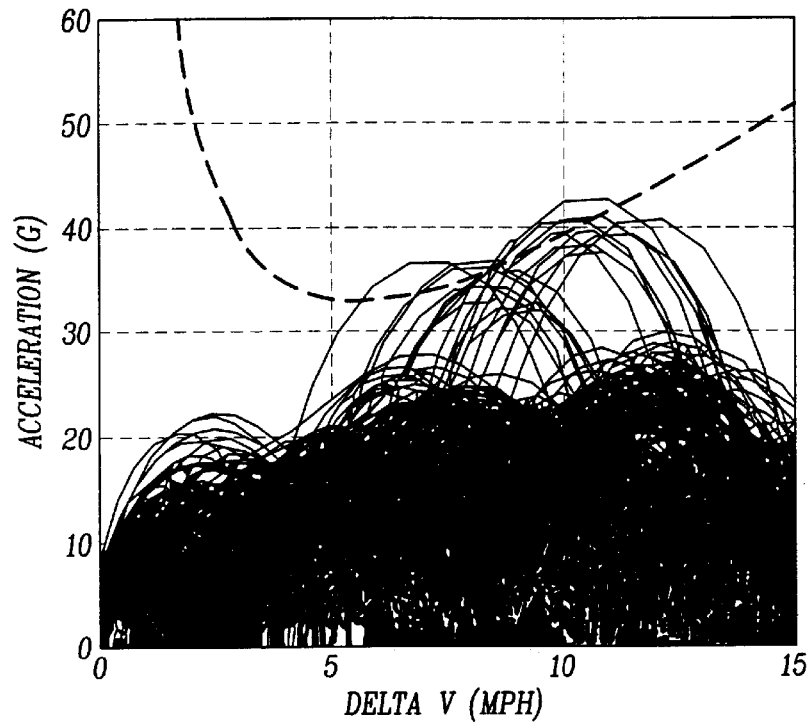
FIGS. 12(a–b) show the effect of the relative position of the threshold curve to the signals on convergence.
Figure 12B:
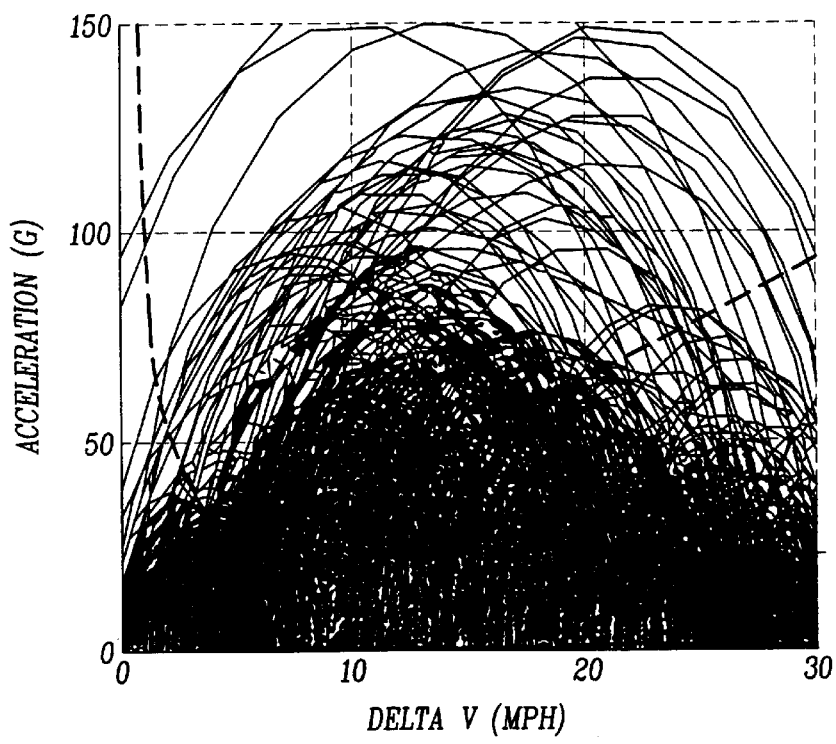

Finally, the reason for the non-converging cases in FIGS. 11(a) and (b) may be examined. The starting point for these searches is rather poor, in terms of their distance from the final optimal area. This is reflected in FIG. 12(a), which shows that the threshold curve produced by this initial parameter point only catches a very small number of the signals. Therefore, the search starts at a locally rather flat area of the response surface for the search. With the same starting threshold curve, but with more signals added, as in the case of FIG. 11(c) or equivalently FIG. 12(b), the search is able to descend to the global optimal area.

In summary, a methodology is developed that treats the determination of the threshold curves for airbag sensor fire by integrating two important variables: the fire-time and fire-rate. The methodology uses the concept of optimization and centers on the construction of a fire objective function that quantifies the quality of the airbag fire condition. Penalty functions have been constructed on which the objective function is based. The freedom of choice of the exact forms of these functions are discussed, and at the same time, disciplines that these functions need to obey are also discussed. Exponentially biased time and velocity penalty functions are presented. Parameters are built into the penalty functions so that relative weights can be put on different conditions of fire.

Such a methodology assumes significance when we intend to include many calibration signals into the threshold curve setting process. The inclusion of a large number of test signals is proposed in this study as a means to achieve a reliable threshold curve relative to the variation of the signals. A method of generating signals based on the characteristics from a limited number of actual physical tests is presented. The signals are then used in the computations of this study.

Numerical examples show that the constructed objective function is able to reflect the idealized requirements used in this paper on the airbag fire event; therefore, it is concluded that it may be used to determine the optimal threshold curve based on the idealized limited examples.

To facilitate an automatic search of the optimal condition, a parameterization of the threshold curve is carried out. A modification is then made to the well-known simplex search method to specifically deal with the non-smooth characteristic of the objective function in the threshold curve parameter space. Numerical results are shown based on the signals generated in this work.

The foregoing discussion disclosed and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims:

What is claimed:

1. A method for determining when an airbag fires in an airbag control system, comprising the steps of:
   obtaining time-histories from vehicle crash sensors;
   deriving an objective function, said objective function including said time-histories as an input, wherein said objective function is a mathematical formula rating the effectiveness of an airbag firing based on firing criteria; and
   determining a threshold firing curve based on said objective function, said threshold firing curve determining when an airbag fires in said airbag control system.

2. The method of claim 1 wherein the step of obtaining firing data includes the steps of:
   performing physical crash tests at specified velocities; and
   recording an airbag sensor reading during the physical crash tests.

3. The method of claim 2 further comprising the step of:
   performing simulations on the airbag sensor readings to obtain additional data sets.

4. The method of claim 3 wherein the step of performing simulations on the airbag sensor readings is done using a Monte Carlo-like method.

5. The method of claim 2 further comprising the step of:
   extrapolating the airbag sensor readings of the physical crash tests to produce extrapolated sensor readings for velocities not used in the physical crash tests.

6. The method of claim 5 further comprising the step of:
   performing simulations on the extrapolated sensor readings to obtain additional data sets.

7. The method of claim 6 wherein the step of performing simulations on the extrapolated sensor readings is done using a Monte Carlo-like method.

8. The method of claim 1 wherein the step of deriving an objective function includes evaluating an airbag's firing based on firing criteria.

9. The method of claim 1 wherein the step of deriving an objective function includes employing a velocity penalty function, where the velocity penalty function quantifies the effectiveness of an airbag firing at a certain velocity.

10. The method of claim 1 wherein the step of deriving an objective function includes employing a time penalty function, where the time penalty function quantifies the effectiveness of an airbag firing at a time during a crash.

11. The method of claim 1 wherein the step of deriving an objective function includes using a single acceleration time history as input.

12. The method of claim 1 wherein the step of deriving an objective function includes using a single acceleration time history as input and producing an output dependant on whether the airbag fires.

13. The method of claim 1 wherein the step of deriving an objective function includes employing the product of a time penalty function and a velocity penalty function, and where the time penalty function quantifies the effectiveness of an airbag firing at a time during a crash and where the velocity penalty function quantifies the effectiveness of an airbag firing at a crash velocity.

14. The method of claim 1 wherein the step of deriving an objective function includes employing the product of a time penalty function and a velocity penalty function and where the objective function is summed over a plurality of input values, and where the time penalty function quantifies the effectiveness of an airbag firing at a time during a crash and where the velocity penalty function quantifies the effectiveness of an airbag firing at a crash velocity.

15. The method of claim 1 wherein the step of deriving an objective function includes employing the product of a time penalty function and a velocity function, where the objective function is summed over a plurality of input values, where the objective function is normalized to the plurality of input values, and where the time penalty function quantifies the effectiveness of an airbag firing at a time during a crash and where the velocity penalty function quantifies the effectiveness of an airbag firing at a crash velocity.

16. The method of claim 1 wherein the step of determining a threshold firing curve includes the steps of:
    selecting a threshold firing curve; and
    computing the objective function of the threshold firing curve.

17. The method of claim 16 wherein the step of determining a threshold firing curve is repeated to evaluate a plurality of threshold firing curves.

18. The method of claim 17 wherein the step of determining a threshold firing curve includes using a search algorithm.

19. The method of claim 1 wherein the step of determining a threshold firing curve based on the objective function includes using a threshold curve that is parameterized, for a given velocity change, using a plurality of variables.

20. The method of claim 1 wherein the step of determining a threshold firing curve based on the objective function includes using a threshold curve parameterized, for a given velocity change, using three variables.

21. A method for determining when an airbag fires in an airbag control system, comprising the steps of:
    obtaining airbag firing data from a sensor in said airbag control system;
    deriving a mathematical objective function, said objective function using said airbag firing data as input and said objective function rating the effectiveness of an airbag firing based on predetermined firing criteria;
    selecting a plurality of threshold firing curves;
    evaluating said plurality of firing curves using said objective function;
    selecting an optimal threshold firing curve from said plurality of threshold firing curves for use in said airbag control system based on said objective function, said optimal threshold firing curve determining when an airbag fires in said airbag control system; and
    using said threshold firing curve in said airbag control system.

22. The method of claim 21 wherein the step of selecting an optimal threshold firing curve includes using an automated search algorithm.

23. The method of claim 21 wherein the step of deriving an objective function includes rating the effectiveness of firing the airbag based on a firing time and a firing velocity, and wherein each component of the objective function has a single acceleration as an input parameter.

24. The method of claim 21 wherein the step of deriving an objective function includes rating the effectiveness of an airbag firing using a velocity penalty function and a time penalty function.

25. The method of claim 21 wherein the step of deriving an objective function includes using the product of a velocity penalty function and a time penalty function.

26. The method of claim 21 wherein the step of deriving an objective function includes using the product of a velocity penalty function and a time penalty function summed over a plurality of input data sets.

27. The method of claim 21 wherein the step of deriving an objective function includes using the product of a velocity penalty function and a time penalty function summed over a plurality of input data sets and normalized to the number of input data sets.

28. The method of claim 21 wherein the step of evaluating said plurality of firing curves includes the steps of:
    finding one threshold curve;
    computing the objective function of the one threshold curve;
    searching a set of possible threshold curves to find another threshold curve with a better rating, as determined by the objective function; and
    repeating the process until no additional threshold curves are found with a better rating.

29. A method for determining when an airbag fires, comprising the steps of:
    obtaining airbag firing data, that includes sensor time-histories recorded from a sensor used in an airbag firing system, said sensor measuring a vehicle's acceleration;
    deriving an objective function, using said sensor time-histories as input, said objective function being a mathematical formula which includes adjustable parameters based on firing criteria for the airbag firing system, said firing criteria including fire-rate and fire-time, and said objective function producing an output that evaluates the effectiveness of an airbag threshold firing curve based on said airbag firing data;
    evaluating a plurality of threshold firing curves using said objective function and said airbag firing data;
    choosing an optimal threshold firing curve from said plurality of threshold firing curves based on said objective function; and implementing said optimal threshold firing curve in said airbag control system, said optimal threshold firing curve and said sensor determining when said airbag fires.

30. The method of claim 29 wherein said airbag firing data further includes Monte Carlo-like simulations on time-histories from physical crash tests to produce additional data sets.

31. The method of claim 29 wherein said objective function includes a product of a time penalty function and a velocity penalty function, and where said product is summed over a plurality of input values.

32. The method of claim 31 where said product is summed over a plurality of input values and normalized to said plurality of input values.

33. The method of claim 29 wherein said threshold curve is parameterized using a plurality of parameters.

34. The method of claim 29 wherein said optimal threshold curve is found using an automated search algorithm.

35. A system for determining when an airbag fires in an airbag control system comprising:

a system for obtaining airbag firing data, said airbag firing data including time-histories from an airbag firing sensor;

a system for deriving an objective function, wherein said objective function is a mathematical formula including said airbag firing data as input and said objective function rating the effectiveness of an airbag firing based on firing criteria; and a system for determining a threshold firing curve in an airbag control system, said system for determining a threshold firing curve including a system for selecting a plurality of threshold firing curves, rating said plurality of threshold firing curves using said objective function and selecting an optimal threshold firing curve for use in said airbag control system.

36. The system of claim 35 wherein said airbag firing data includes simulations on physical crash tests to produce additional data sets.

37. The system of claim 35 wherein said objective function includes a velocity penalty function, said velocity penalty function being a generally parabolic curve having a designated control fire velocity parameter.

38. The system of claim 35 wherein said objective function includes a time penalty function, said time penalty function being piece-wise continuous.

39. The system of claim 35 wherein said objective function is normalized over a plurality of input values.

40. The system of claim 35 wherein said objective function includes a product of a velocity penalty function and a time penalty function, and where the product is summed over a plurality of inputs and normalized to the plurality of inputs.

* * * * *